United States Patent
Barajas Zamora et al.

(10) Patent No.: US 12,450,650 B2
(45) Date of Patent: Oct. 21, 2025

(54) METHOD, DEVICE, AND NON-TRANSITORY MACHINE READABLE MEDIUM FOR CONTENT ITEM SELECTION AND MEASUREMENT DETERMINATION

(71) Applicant: Oath Inc., New York, NY (US)

(72) Inventors: Joel Barajas Zamora, Fremont, CA (US); Lakshmi Narayan Bhamidipati, Sunnyvale, CA (US); Ilya Nathaniel Slain, Santa Clara, CA (US); Lioz Medina, Jerusalem (IL); Milena Petrova Krasteva, Mountain View, CA (US)

(73) Assignee: Yahoo Ad Tech LLC, New York, NY (US)

(*) Notice: Subject to any disclaimer, the term of this patent is extended or adjusted under 35 U.S.C. 154(b) by 53 days.

(21) Appl. No.: 16/707,431

(22) Filed: Dec. 9, 2019

(65) Prior Publication Data

US 2021/0174433 A1 Jun. 10, 2021

(51) Int. Cl.
*G06Q 30/00* (2023.01)
*G06Q 30/0241* (2023.01)
(Continued)

(52) U.S. Cl.
CPC ......... *G06Q 30/08* (2013.01); *G06Q 30/0241* (2013.01); *G06Q 30/0631* (2013.01); *G06Q 30/0275* (2013.01)

(58) Field of Classification Search
CPC ..... G06Q 30/08; G06Q 30/0601–0645; G06Q 30/02; G06Q 30/0242; G06Q 30/0224;
(Continued)

(56) References Cited

U.S. PATENT DOCUMENTS 9,501,549 B1 * 11/2016 Wang .................... G06F 16/951
9,858,590 B1 * 1/2018 Dean .................. G06Q 30/0244
(Continued)

OTHER PUBLICATIONS

Johnson GA, Lewis RA, Nubbemeyer EI. Ghost Ads: Improving the Economics of Measuring Online Ad Effectiveness. Journal of Marketing Research. 2017;54(6):867-884. doi:10.1509/jmr.15.0297 (Year: 2017).*

(Continued)

*Primary Examiner* — Jeffrey A. Smith
*Assistant Examiner* — Kennedy Gibson-Wynn
(74) *Attorney, Agent, or Firm* — Cooper Legal Group LLC

(57) ABSTRACT

One or more computing devices, systems, and/or methods for selecting content items for transmission to client devices are provided. A request for content may be received. A second plurality of content items associated with a plurality of rankings may be selected from a plurality of content items based upon a plurality of bid values. A quantity of content items of the second plurality of content items may be greater than a quantity of content items associated with the request for content. One or more ghost content items associated with one or more rankings of the plurality of rankings may be identified. A ghost impression indicator associated with a ghost content item of the one or more ghost content items may be stored based upon a determination that a ranking, of the one or more rankings, associated with the ghost content item matches a second ranking of a presented content item.

19 Claims, 14 Drawing Sheets

(51) Int. Cl.
*G06Q 30/0601* (2023.01)
*G06Q 30/08* (2012.01)
*G06Q 30/0273* (2023.01)

(58) Field of Classification Search
CPC ........... G06Q 30/0241; G06Q 30/0243; G06Q 30/0244; G06Q 30/0251; G06Q 30/0253; G06Q 30/0254; G06Q 30/0255; G06Q 30/0257; G06Q 30/0267; G06Q 30/0269; G06Q 30/0275
USPC ........................................................ 705/26.3
See application file for complete search history.

(56) References Cited

U.S. PATENT DOCUMENTS

| | | | | |
|---|---|---|---|---|
| 10,049,386 | B1* | 8/2018 | Venkataraman ... | G06Q 30/0256 |
| 10,650,403 | B2* | 5/2020 | Pai ..................... | G06Q 30/0244 |
| 10,846,587 | B2* | 11/2020 | Liu ........................ | G06N 5/022 |
| 2002/0004735 | A1* | 1/2002 | Gross ................ | G06Q 30/0214 |
| | | | | 705/26.41 |
| 2002/0007330 | A1* | 1/2002 | Kumar ................. | G06Q 20/102 |
| | | | | 705/40 |
| 2006/0271671 | A1* | 11/2006 | Hansen ................. | G06Q 30/02 |
| | | | | 709/224 |
| 2015/0073920 | A1* | 3/2015 | Pashkevich ............ | H04W 4/21 |
| | | | | 705/14.71 |
| 2016/0335659 | A1* | 11/2016 | Lewis ................ | G06Q 30/0244 |
| 2017/0061502 | A1* | 3/2017 | Zhang ................ | G06Q 30/0275 |
| 2017/0061528 | A1* | 3/2017 | Arora ................... | G06F 16/958 |
| 2017/0068987 | A1* | 3/2017 | Levinson ........... | G06Q 30/0246 |
| 2017/0372352 | A1* | 12/2017 | Riordan ............. | G06Q 30/0277 |
| 2019/0026775 | A1* | 1/2019 | Bhalgat .............. | G06Q 30/0275 |
| 2020/0401634 | A1* | 12/2020 | Duan .................... | G06F 16/958 |

OTHER PUBLICATIONS

Cui, Qing, et al. "Global Optimization for Advertisement Selection in Sponsored Search." Journal of Computer Science and Technology 30.2 (2015): 295-310. ProQuest. Web. Jun. 9, 2022. (Year: 2015).*

Shariat, Shahriar, Burkay Orten, and Ali Dasdan. "Online Evaluation of Bid Prediction Models in a Large-Scale Computational Advertising Platform: Decision Making and Insights." Knowledge and Information Systems 51.1 (2017): 37-60. ProQuest. Web. Jun. 9, 2022. (Year: 2017).*

Grinberg, Nir. "Computational Methods in the Study of Individuals' Attention Online." Order No. 10278764 Cornell University, 2017. Ann Arbor: ProQuest. Web. Dec. 1, 2022. (Year: 2017).*

Payne, T., David, E., Jennings, N. R., & Sharifi, M. (May 2006). Auction mechanisms for efficient advertisement selection on public displays. In ECAI (pp. 285-289). (Year: 2006).*

Pavlou, Paul A., and David W. Stewart. "Measuring the effects and effectiveness of interactive advertising: A research agenda." Journal of Interactive Advertising 1.1 (2000): 61-77. (Year: 2000).*

Alton, Liz. "What Is a Ghost Ad? How to Use These Tests to Prove Social Advertising Effectiveness." Skyword, Oct. 24, 2019, www.skyword.com/contentstandard/what-is-a-ghost-ad-how-to-use-these-tests-to-prove-social-advertising-effectiveness/. Accessed Jun. 3, 2025. (Year: 2019).*

* cited by examiner

METHOD, DEVICE, AND NON-TRANSITORY MACHINE READABLE MEDIUM FOR CONTENT ITEM SELECTION AND MEASUREMENT DETERMINATION

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company. The company may want measurements on an impact that the advertisements have on consumers (e.g., whether the advertisements have an effect on driving consumers to purchase and/or use the products and/or services).

SUMMARY

In accordance with the present disclosure, one or more computing devices and/or methods are provided. In an example, a first request for content associated with a first client device may be received. The first request for content may be indicative of a first quantity of content items. A first plurality of bid values associated with a first plurality of content items may be determined. A second plurality of content items may be selected from the first plurality of content items based upon the first plurality of bid values. The second plurality of content items may be associated with a first plurality of rankings. A second quantity of content items of the second plurality of content items may be greater than the first quantity of content items associated with the first request for content. One or more first ghost content items of the second plurality of content items may be identified. The one or more first ghost content items are associated with one or more first rankings of the first plurality of rankings. A third plurality of content items, of the second plurality of content items, that are not ghost content items may be selected for presentation via the first client device. A third quantity of content items of the third plurality of content items may be equal to the first quantity of content items associated with the first request for content. The third plurality of content items may be associated with a second plurality of rankings. A first ghost impression indicator associated with a first ghost content item of the one or more first ghost content items may be stored based upon a determination that a first ranking, of the one or more first rankings, associated with the first ghost content item matches a second ranking of the second plurality of rankings.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
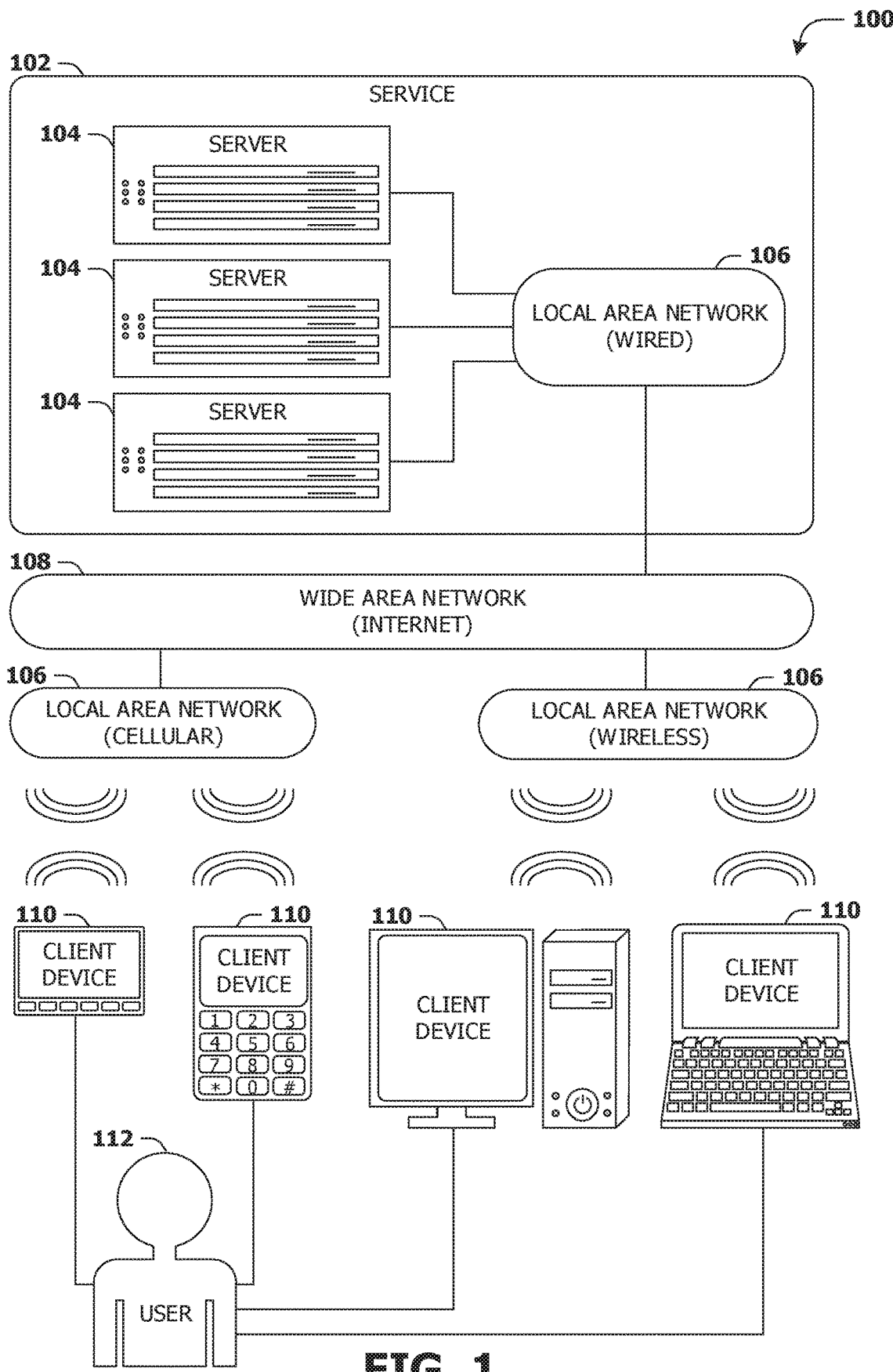
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
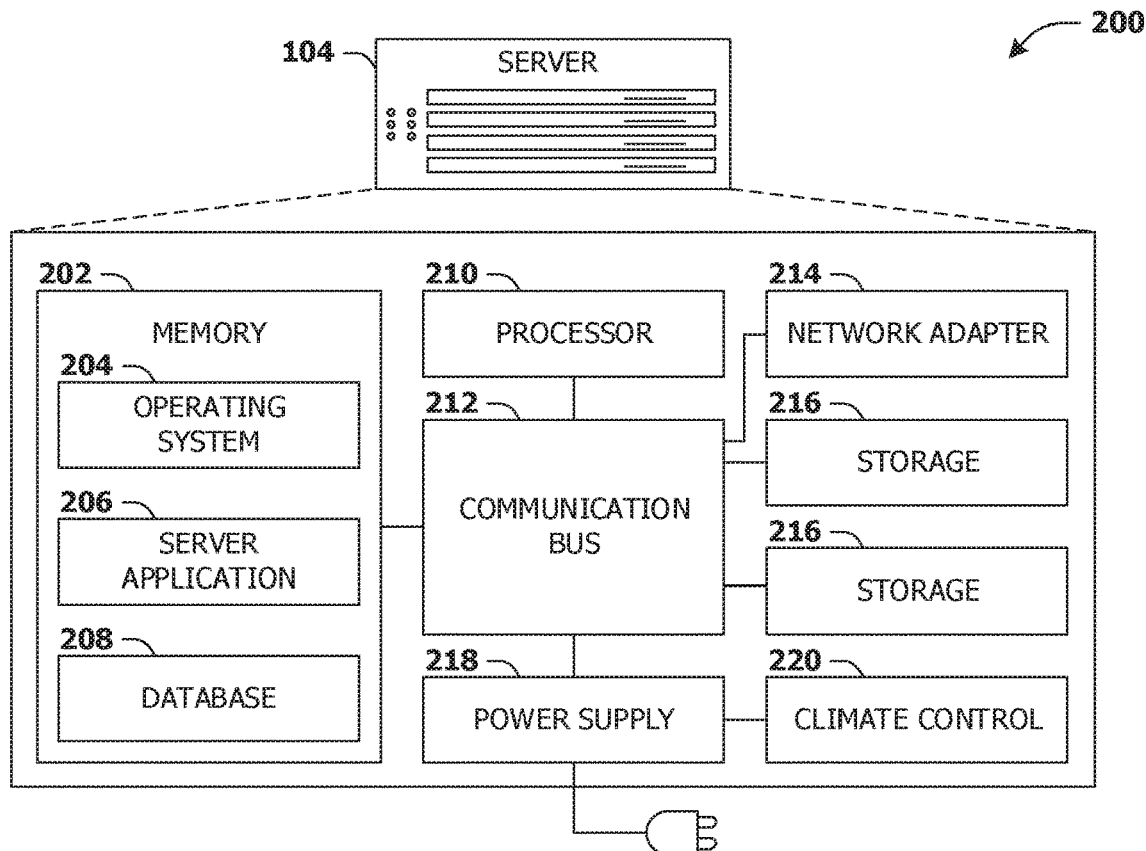
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
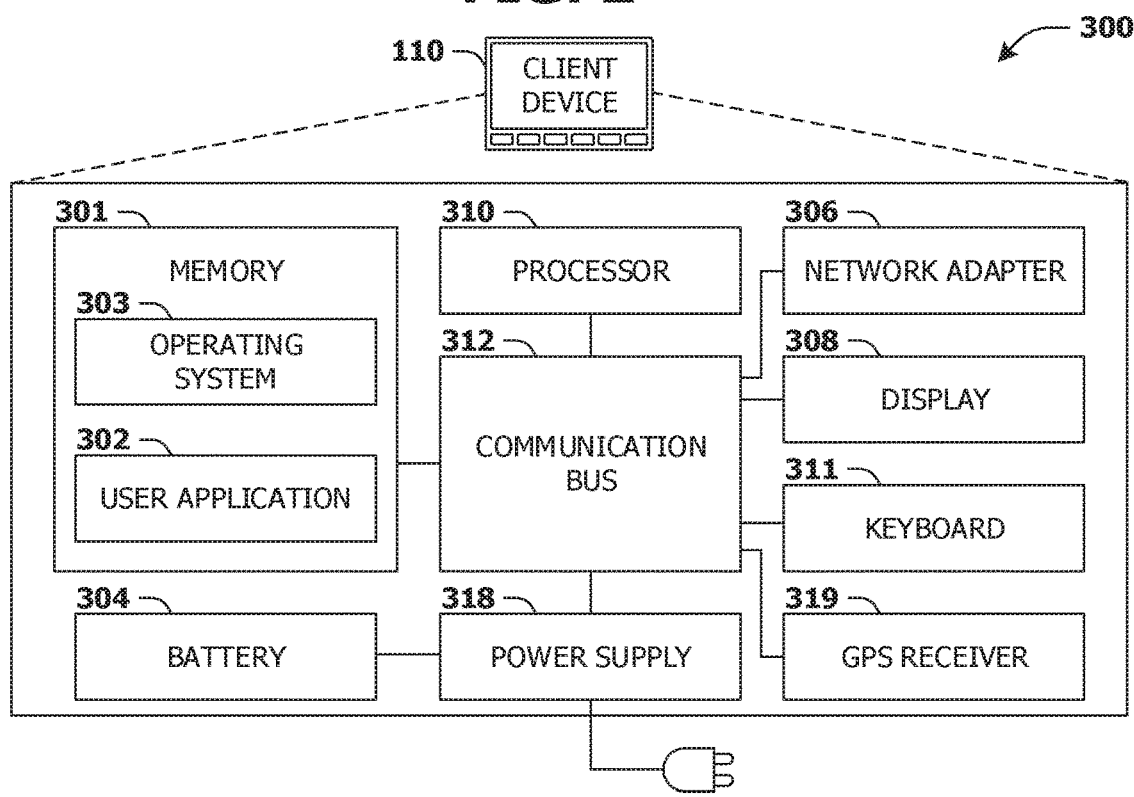
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting content for transmission to devices and/or determining measurements are provided. In an example, a content system may present one or more content items via client devices. The one or more content items may be associated with a first entity and/or associated with one or more products, one or more services, etc. associated with the first entity. For example, the one or more content items may be associated with a content campaign (e.g., an advertisement campaign) for promoting the one or more products and/or the one or more services associated with the first entity. Measurements and/or analyses on the content campaign may be used by the first entity to understand at least one of an effectiveness of the content campaign, an impact that the content campaign has on consumers, a measure of conversion events that are performed as a result of the content campaign, etc. Accordingly, the first entity may request that an experiment is performed for determining the measurements and/or analyses. In order to perform the experiment, a plurality of client devices may be split into a first set of client devices (e.g., a test group) and a second set of client devices (e.g., a control group). A first content item associated with the content campaign may be transmitted to client devices of the first set of client devices and/or one or more other content items (in place of the first content item) may be transmitted to client devices of the second set of client devices (such as in instances where the first content item is selected in an auction). One or more first measurements associated with the first set of client devices and/or one or more second measurements associated with the second set of client devices may be determined. The one or more first measurements may be compared with the one or more second measurements to determine an effectiveness of the first content item and/or an impact of the first content item on consumers.

In accordance with one or more of the techniques presented herein, a first request for content associated with a first client device may be received. The first request for content may be indicative of a first quantity of content items. A first plurality of bid values associated with a first plurality of content items may be determined. A second plurality of content items may be selected from the first plurality of content items based upon the first plurality of bid values. The second plurality of content items may be associated with a first plurality of rankings. A second quantity of content items of the second plurality of content items may be greater than the first quantity of content items associated with the first request for content. One or more first ghost content items of the second plurality of content items may be identified. The one or more first ghost content items are associated with one or more first rankings of the first plurality of rankings. A third plurality of content items that are not ghost content items may be selected from the second plurality of content items for presentation via the first client device. A third quantity of content items of the third plurality of content items may be equal to the first quantity of content items associated with the first request for content. The third plurality of content items may be associated with a second plurality of rankings. In some examples, a first content item of the third plurality of content items may be presented via the first client device. The first content item may be associated with a first ranking of the second plurality of rankings. A first ghost impression indicator associated with a first ghost content item of the one or more first ghost content items may be stored based upon a determination that a second ranking, of the one or more first rankings, associated with the first ghost content item matches the first ranking associated with the first content item.

Figure 4:
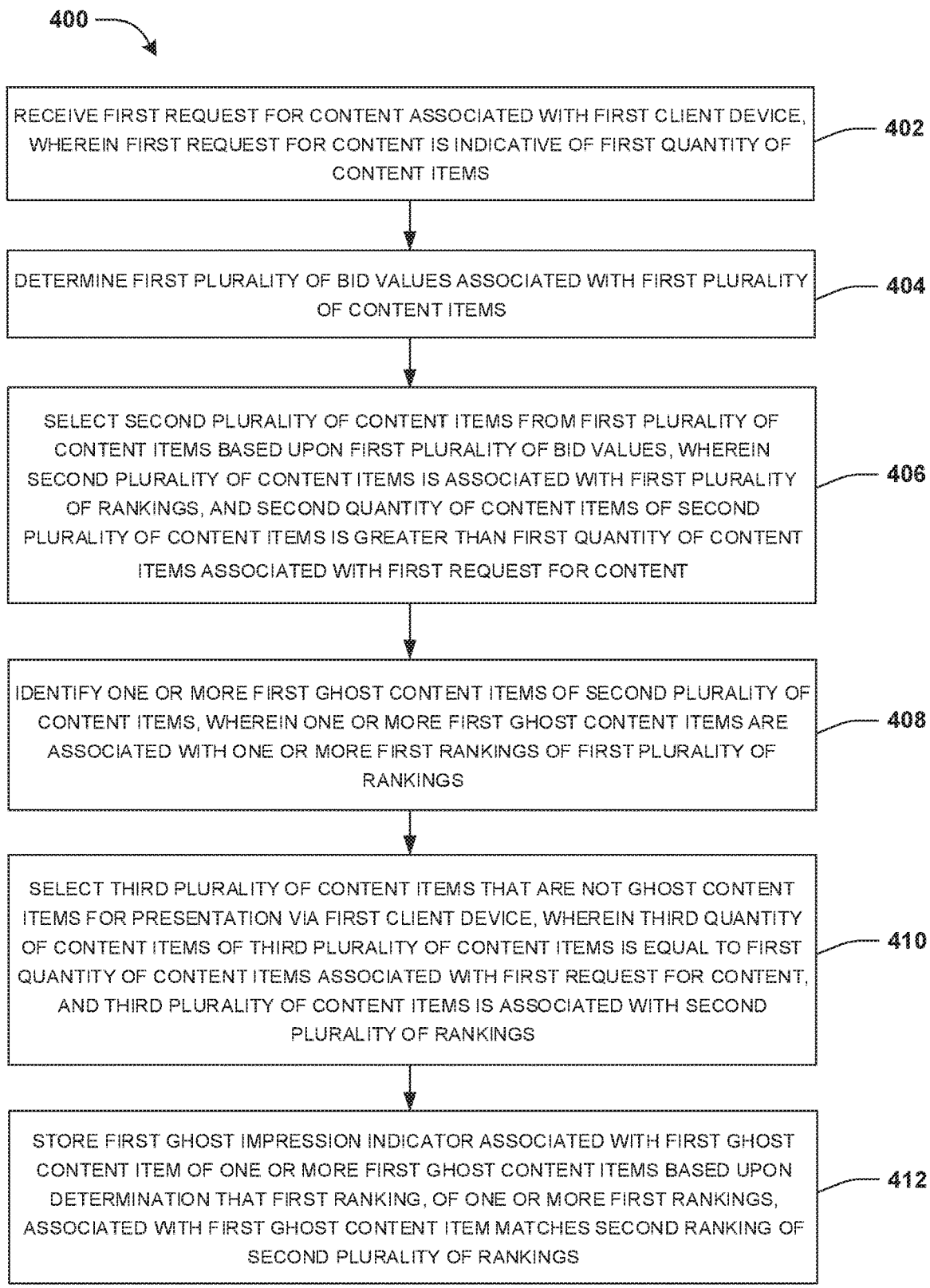
FIG. 4 is a flow chart illustrating an example method for selecting content for transmission to devices and/or determining measurements.

An embodiment of selecting content for transmission to devices and/or determining measurements is illustrated by an example method 400 of FIG. 4. A content system for presenting content via client devices may be provided. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may provide content items for presentation via client devices based upon (past) user activity associated with the client devices. For example, the content system may generate and/or maintain a user profile database comprising a plurality of user profiles associated with the plurality of client devices and/or a plurality of user accounts (e.g., email accounts, messaging accounts, content platform accounts for uploading content and/or for consuming articles, videos and/or music, etc.) associated with the content system. A user profile of the plurality of user profiles may comprise an identifier associated with at least one of the user profile, a client device associated with the user profile, a user account associated with the user profile, etc. Alternatively and/or additionally, a user profile of the plurality of user profiles may comprise demographic information, such as an age (and/or age range), family size, gender, occupation, income, and/or other demographic information. Alternatively and/or additionally, a user profile of the plurality of user profiles may comprise activity information associated with a client device and/or a user account. For example, the activity information may be indicative of at least one of one or more consumed content items (e.g., an article, a video, an audio file, an image, a web page, an advertisement, an email, a message, etc. consumed by a user), one or more accessed content items (e.g., an article, a video, an audio file, an image, a web page, an advertisement, an email, a message, etc. accessed by a client device), one or more selected content items (e.g., an article, a video, an audio file, an image, a web page, an advertisement, an email, a message, etc. selected via a client device), one or more content item interactions (e.g., an advertisement impression, an advertisement click, a conversion associated with an advertisement, etc.), etc. In some examples, the content system may provide content items for presentation via client devices based upon user profiles of the user profile database.

In some examples, a first entity may access and/or interact with a service, such as an advertising service, that provides a platform for uploading, to the content system, content to be presented via client devices. In some examples, the first entity may be an advertiser, a company, a brand, an organization, etc. One or more content items (e.g., one or more advertisements) associated with the first entity may be received from a device associated with the first entity. The one or more content items may be associated with one or more products, one or more services, etc. associated with the first entity. For example, the first entity may upload, to the content system, the one or more content items. The one or more content items may be associated with a content campaign for promoting the one or more products and/or the one or more services associated with the first entity. Alternatively and/or additionally, content information associated with the content campaign may be received from the device associated with the entity. For example, the content information may comprise one or more of a first budget associated with the content campaign, a first target spend pattern associated with the content campaign, a duration of time for which the one or more content items shall be presented by the content system, one or more campaign goals associated with the content campaign and/or the one or more content items (e.g., a number of impressions associated with the one or more content items, a number of interactions associated with the one or more content items, a number of conversion events performed as a result of the content campaign, etc.), etc.

In some examples, a first content item associated with the content campaign may be presented via client devices associated with the content system. The first entity may request that a first experiment is performed for determining measurements and/or analyses on the content campaign associated with at least one of an effectiveness of the content campaign and/or the first content item, an impact that the content campaign and/or the first content item has on consumers, a measure of conversion events that are performed as a result of presenting the first content item via client devices, a measure of revenue received as a result of the presenting the first content item via client devices, etc.

In some examples, a plurality of identifiers associated with the plurality of client devices (associated with the content system) may be identified and/or determined. In some examples, an identifier of the plurality of identifiers may correspond to identification information associated with a client device of the plurality of client devices, such as an IP address, a network identification address associated with a network that the client device is connected to and/or a different type of identification. Alternatively and/or additionally, an identifier of the plurality of identifiers may correspond to identification information associated with a user profile and/or a user account corresponding to a client device of the plurality of client devices, such as at least one of a username, a user account identification, etc.

In some examples, a first set of client devices of the plurality of client devices and/or a first set of user accounts of the plurality of user accounts may be assigned to a first group (e.g., a test group). For example, the first set of client devices and/or the first set of user accounts may be assigned to the first group by assigning a first set of identifiers, associated with the first set of client devices and/or the first set of user accounts, to the first group. In an example, a first identifier data structure (e.g., at least one of a first list of identifiers, a first array comprising identifiers, etc.) may be generated based upon the first group. For example, the first identifier data structure may comprise the first set of identifiers. Alternatively and/or additionally, indications of the second group may be stored in a first set of user profiles associated with the first set of client devices and/or the first set of user accounts.

In some examples, a second set of client devices of the plurality of client devices and/or a second set of user accounts of the plurality of user accounts may be assigned to a second group (e.g., a control group). The first set of client devices may be different than and/or separate from the second set of client devices. Alternatively and/or additionally, the first set of user accounts may be different than and/or separate from the first set of user accounts. The second set of client devices and/or the second set of user accounts may be assigned to the second group by assigning a second set of identifiers, associated with the second set of client devices and/or the second set of user accounts, to the second group. In an example, a second identifier data structure (e.g., at least one of a second list of identifiers, a second array comprising identifiers, etc.) may be generated based upon the second group. For example, the second identifier data structure may comprise the second set of identifiers. Alternatively and/or additionally, indications of the second group may be stored in a second set of user profiles associated with the second set of client devices and/or the second set of user accounts.

In some examples, during the first experiment, the first content item may be presented via client devices of the first group and/or the first content item may not be presented via client devices of the second group. For example, during the first experiment, rather than presenting the first content item to client devices of the second group, one or more other content items may be presented via client devices of the second group, such as in instances where the first content item is selected in an auction.

In some examples, the first set of client devices may be assigned to the first group and/or the second set of client devices may be assigned to the second group randomly. Alternatively and/or additionally, the first set of client devices may not be randomly assigned to the first group and/or the second set of client devices may not be randomly assigned to the second group.

In some examples, the first set of client devices may correspond to a first proportion of the plurality of client devices associated with the content system (and/or the first set of user accounts may correspond to the first proportion of the plurality of user accounts). In some examples, the second set of client devices may correspond to a second proportion of the plurality of client devices associated with the content system (and/or the second set of user accounts may correspond to the second proportion of the plurality of user accounts).

In some examples, the first proportion, the second proportion, a quantity of client devices of the first set of client devices, a quantity of user accounts of the first set of user accounts, a quantity of client devices of the second set of client devices and/or a quantity of user accounts of the second set of user accounts may be based upon experiment information. In some examples, the experiment information may be retrieved from an experiment database associated with the content system. Alternatively and/or additionally, the experiment information may be received from a device associated with the first entity. In some examples, the experiment information may be indicative of the first proportion, the second proportion, the quantity of client devices of the first set of client devices, the quantity of user accounts of the first set of user accounts, the quantity of client devices of the second set of client devices and/or the quantity of user accounts of the second set of user accounts. In an example, the first proportion may correspond to between 75% and 95% (and/or a different proportion) and/or the second proportion may correspond to between 5% and 25% (and/or a different proportion). In an example, the first set of client devices may correspond to about 90% of the plurality of client devices and/or the second set of client devices may correspond to about 10% of the plurality of client devices.

A first user, such as user Jill, (and/or a first client device associated with the first user) may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

At 402, a first request for content associated with the first client device may be received. In some examples, the first request for content may be received responsive to the first client device accessing a first internet resource associated with the content system (e.g., one or more of a web page of a website associated with the content system, an application associated with the content system, an internet game associated with the content system, etc.). For example, the first client device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the first client device. In some examples, the first request for content may correspond to a request to be provided with one or more content items (e.g., advertisements, images, links, videos, etc.) for presentation via the first internet resource.

In some examples, the first request for content may be indicative of a first quantity of content items. The first quantity of content items may correspond to a quantity of content items that is requested for presentation via the first client device and/or the first internet resource. The first internet resource may be configured to present multiple content items, corresponding to the quantity of content items, in multiple serve areas throughout the internet resource.

In an example, the first internet resource may comprise a first serve area corresponding to a banner area at the top of the first internet resource, a second serve area corresponding to a column on a left side of the first internet resource, a third serve area corresponding to a column on a right side of the first internet resource, etc. In the example, the first quantity of content items may be at least three (e.g., one or more content items for each serve area of the multiple serve areas). A serve area of the multiple serve areas may be configured to present a content item of the multiple content items.

In another example, the first internet resource may present a list of items, such as one or more of a list of news items (e.g., a news item may comprise an image, a video, a link and/or a description associated with a news article), a list of search items (e.g., a search item may comprise an image, a video, a link and/or a description associated with a search result of a search), a list of social media items (e.g., social media posts), a list of blog items, a list of videos, a list of songs, etc. The multiple serve areas may be distributed throughout the list of items. In an example, one or more initial items of the list of items may be followed by a serve area configured to display a content item of the multiple content items, one or more items of the list of items following the content item may be followed by another serve area configured to display another content item of the multiple content items, etc. Accordingly, the multiple content items may each be displayed and/or consumed by scrolling through the list of items and/or through the serve areas configured to display the multiple content items.

In some examples, the first request for content may comprise content type information indicative of one or more content types. For example the content type information may be indicative of a topic, a format and/or a structure of content items to be presented via the first internet resource. In an example, the content type information may be indicative of video content items (e.g., a content item comprising one or more videos with sound and/or a content item comprising one or more videos without sound). Alternatively and/or additionally, the content type information may be indicative of audio content items. Alternatively and/or additionally, the content type information may be indicative of image content items (e.g., a content item comprising one or more images).

Alternatively and/or additionally, the content type information may be indicative of native content. For example, the content type information may be indicative of a content item format and/or a content item structure that is similar to a format and/or structure associated with the first internet resource. For example, the content item format and/or the content item structure may be similar to a topic, a format and/or a structure of items of the list of items. In some examples, a native content item associated with the native content may be similar to (e.g., visually similar to) items of the list of items.

In some examples, responsive to receiving the first request for content, a bidding process may be performed to select one or more content items from a first plurality of content items participating in a first auction (e.g., an auction for selection of one or more content items to present via the first client device). In some examples, the first plurality of content items may comprise content items associated with the content type information (e.g., the first plurality of content items may match the topic, format and/or the structure indicated by the content type information of the first request for content). In some examples, the first plurality of content items may be selected from a content item database based upon a determination that content items of the first plurality of content items match the topic, format and/or the structure indicated by the content type information of the first request for content.

At 404, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items.

At 406, a second plurality of content items may be selected from the first plurality of content items based upon the first plurality of bid values. In some examples, the second plurality of content items may be selected in the first auction associated with the first request for content. Alternatively and/or additionally, the second plurality of content items may be selected from the first plurality of content items based upon a determination that content items of the second plurality of content items are associated with bid values that are higher than other bid values associated with other content items of the first plurality of content items.

Alternatively and/or additionally, the second plurality of content items may be selected from the first plurality of content items based upon a first plurality of click probabilities associated with the first plurality of content items. The first plurality of click probabilities may be determined based upon content information associated with the first plurality of content items and/or the first user profile associated with the first client device. In some examples, the first user profile may be identified based upon a first identifier associated with the first client device. In some examples, the first identifier may be determined based upon the first request for content. For example, the first request for content may be indicative of the first identifier associated with the first client device. The first request for content may be analyzed to determine the first identifier. The first user profile may be indicative of the first identifier. For example, the first user profile may be identified by determining that the first user profile comprises the first identifier associated with the first request for content.

In some examples, a click probability of the first plurality of click probabilities may correspond to a probability of receiving a selection of a content item responsive to presenting the content item via the first client device. Alternatively and/or additionally, a click probability of the first plurality of click probabilities may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device. In some examples, the second plurality of content items may be selected from the first plurality of content items based upon a determination that content items of the second plurality of content items are associated with click probabilities that are higher than other click probabilities associated with other content items of the first plurality of content items.

In some examples, a first plurality of content item scores associated with the first plurality of content items may be determined. For example, the first plurality of content items scores may be determined based upon the first plurality of bid values and/or the first plurality of click probabilities. In an example, one or more operations (e.g., mathematical operations) may be performed using a bid value of the first plurality of bid values and a click probability of the first plurality of click probabilities to determine a content item score of the first plurality of content item scores. In some examples, the second plurality of content items may be selected from the first plurality of content items based upon the first plurality of content items scores associated with the first plurality of content items. For example, the second plurality of content items may be selected from the first plurality of content items based upon a determination that content items of the second plurality of content items are associated with content item scores that are higher than other content item scores associated with other content items of the first plurality of content items.

Alternatively and/or additionally, a first plurality of rankings associated with the first plurality of content items may be determined based upon the first plurality of bid values, the first plurality of click probabilities and/or the first plurality of content item scores. For example, the first plurality of content items may be ranked based upon the first plurality of bid values, the first plurality of click probabilities and/or the first plurality of content item scores to determine the first plurality of rankings. In some examples, the second plurality of content items may be selected from the first plurality of content items based upon the first plurality of rankings. For example, the second plurality of content items may be selected from the first plurality of content items based upon a determination that content items of the second plurality of content items are associated with rankings that are higher than other rankings associated with other content items of the first plurality of content items.

In some examples, a second quantity of content items of the second plurality of content items may be greater than the first quantity of content items associated with the first request for content. For example, the second quantity of content items may exceed the first quantity of content items by a first difference in quantity. In an example, the first quantity of content items may correspond to 6 content items and/or the second quantity of content items may correspond to 10 content items. In the example, the first difference in quantity corresponds to 4.

In some examples, the second plurality of content items may be selected from the first plurality of content items based upon the second quantity of content items. For example, the second plurality of content items may be selected from the first plurality of content items by selecting content items, amounting to the second quantity of content items, from the first plurality of content items based upon the first plurality of bid values, the first plurality of click probabilities, the first plurality of content item scores and/or the first plurality of rankings.

In some examples, the first difference in quantity and/or the second quantity of content items may be determined based upon a content item selection data structure. The content item selection data structure may be indicative of a plurality of differences in quantity associated with a plurality of request quantities. A request quantity of the plurality of request quantities may correspond to a quantity of content items indicated by a request for content, such as the first quantity of content items indicated by the first request for content. In some examples, a difference in quantity of the plurality of differences in quantity may correspond to a difference in quantity that is implemented for selecting content items responsive to receiving a request for content indicative of a request quantity of the plurality of request quantities.

In an example, the first quantity of content items may correspond to an exemplary request quantity of the plurality of request quantities and/or the exemplary request quantity may be associated with an exemplary difference in quantity of the plurality of differences in quantity. The content item selection data structure may be analyzed based upon the first quantity of content items to determine that the first quantity of content items corresponds to the exemplary request quantity. The second quantity of content items and/or the first difference in quantity may be determined based upon the exemplary difference in quantity associated with the exemplary request quantity that corresponds to the first quantity of content items.

In some examples, the second plurality of content items may be associated with a second plurality of rankings. In some examples, the second plurality of rankings may be higher than other rankings of the first plurality of rankings. In an example, the second plurality of rankings may comprise a first ranking #1 associated with a highest ranked content item of the second plurality of content items, a second ranking #2 associated with a second-highest ranked content item of the second plurality of content items, a third ranking #3 associated with a third-highest ranked content item of the second plurality of content items, etc.

At 408, one or more first ghost content items of the second plurality of content items may be identified. The one or more first ghost content items may be associated with one or more first rankings of the second plurality of rankings.

In some examples, the first content item (associated with the first entity) may be a ghost content item of the one or more first ghost content items. A ghost content item, as used herein, may correspond to a content item which is included in an auction and/or a bidding process for selecting content for presentation via a client device, but is not transmitted to the client device and/or presented via the client device (even if the content item wins the auction and/or is selected in the auction). In an example, the first content item may correspond to a ghost content item of the one or more first ghost content items due to the first client device being included in the second group (e.g., the second set of client devices) to which the first content item is not provided.

In some examples, one or more potential ghost content items of the second plurality of content items may be identified. A potential ghost content item (and/or each potential ghost content item of the one or more potential ghost content items) of the one or more potential ghost content items may correspond to a content item participating in an experiment (e.g., an experiment for determining measurements and/or analyses associated with the content item). Alternatively and/or additionally, the potential ghost content item (and/or each potential ghost content item of the one or more potential ghost content items) may be associated with a control group of client devices to which the potential ghost content item is not provided. For example, the potential ghost content item may be included in an auction associated with selecting a content item for presentation via a client device of the control group of client devices. However, responsive to the potential ghost content item winning the auction (and/or responsive to the potential ghost content item being selected in the auction), rather than providing the potential ghost content item for presentation via the client device, a different content item may be provided and/or presented in place of the potential ghost content item.

Alternatively and/or additionally, the potential ghost content item may be associated with a test group of client devices to which the potential ghost content item is provided (if the potential ghost content item is selected for presentation via a client device of the test group of client devices). For example, the potential ghost content item may be included in an auction associated with selecting a content item for presentation via a client device of the test group of client devices. Responsive to the potential ghost content item winning the auction (and/or responsive to the potential ghost content item being selected for presentation via the client device), the potential ghost content item may be provided and/or presented via the client device.

In some examples, content information associated with the second plurality of content items may be analyzed to identify the one or more potential ghost content items of the second plurality of content items. For example, the content information may be indicative of one or more content items of the second plurality of content items being potential ghost content items. In an example, the content information may be indicative of one or more experiment statuses associated with the second plurality of content items. An experiment status of the one or more experiment status may be indicative of whether an experiment associated with a content item is ongoing. A content item of the second plurality of content items may be identified as a potential ghost content item responsive to a determination that an experiment status associated with the content item is indicative of an ongoing experiment.

In some examples, ghost information associated with the one or more potential ghost content items may be analyzed to identify the one or more first ghost content items from amongst the one or more potential ghost content items (and/or from amongst the second plurality of content items).

In some examples, the ghost information may be indicative of a set of client devices of a test group associated with a potential ghost content item of the one or more potential ghost content items (and/or a set of identifiers associated with the test group) and/or a set of client devices of a control group associated with the potential ghost content item (and/or a set of identifiers associated with the control group). For example, a ghost content item of the one or more first ghost content items may be identified from amongst the one or more potential ghost content items based upon a determination that the ghost information is indicative of the first client device being included in a control group associated with the ghost content item.

In an example, the ghost information may be analyzed to identify the first content item from amongst the one or more potential ghost content items (and/or determine that the first content item is a ghost content item of the one or more first ghost content items). For example, the ghost information may be analyzed based upon the first identifier associated with the first client device. In some examples, the ghost information may comprise the first identifier data structure and/or the second identifier data structure. The second identifier data structure may be analyzed to determine whether the second identifier data structure comprises the first identifier. The first content item may be determined to be a ghost content item of the one or more first ghost content items based upon a determination that the second identifier data structure comprises the first identifier.

Alternatively and/or additionally, the ghost information may be comprised within the first user profile associated with the first client device. In some examples, the first content item may be determined to be a ghost content item of the one or more first ghost content items based upon a determination that the first user profile and/or the ghost information comprises an indication of the second group associated with the first experiment.

In some examples, after the first auction is performed (and/or after the second plurality of content items are selected in the first auction), the one or more first ghost content items may be removed from selected content items of the first auction that may potentially be presented via the first client device based upon the first request for content. For example, after the first auction is performed (and/or after the second plurality of content items are selected in the first auction), the one or more first ghost content items may not be considered for presentation via the first client device.

It may be appreciated that selecting the second plurality of content items having the second quantity of content items exceeding the first quantity of content items associated with the first request for content may reduce a probability that removing one or more ghost content items from selected content items results in a quantity of selected content items having a quantity that is less than the first quantity of content items associated with the first request for content. For example, the first difference in quantity between the first quantity of content items associated with the first request for content and/or the second quantity of content items of the second plurality of content items (selected in the first auction) may be configured minimize the probability. Accordingly, a different auction, that may otherwise be performed due to an insufficient quantity of selected content items after removing one or more ghost content items from selected content items, may not need to be performed as a result of selecting the second plurality of content items having the second quantity of content items exceeding the first quantity of content items associated with the first request for content.

In some examples, the first difference in quantity and/or the plurality of differences in quantity of the content item selection data structure may be determined based upon a quantity of ongoing experiments associated with the content system (e.g., a total quantity of ongoing experiments that are being performed to determine measurements associated with content items). For example, the first difference in quantity may be set to a value equal to (and/or different than) the quantity of ongoing experiments. Accordingly, selecting the second plurality of content items having the second quantity of content items exceeding the first quantity of content items by the first difference in quantity prevents an instance where removing one or more ghost content items from selected content items results in a quantity of selected content items having a quantity that is less than the first quantity of content items associated with the first request for content.

In some examples, the second plurality of content items may comprise a first set of content items and/or a second set of content items. A quantity of content items of the first set of content items may be equal to the first quantity of content items associated with the first request for content. Alternatively and/or additionally, a quantity of content items of the second set of content items may be equal to the first difference in quantity. In some examples, rankings associated with the first set of content items may be higher than rankings associated with the second set of content items. In some examples, the second set of content items may be selected from the first plurality of content items based upon a determination that the second set of content items are not potential ghost content items (e.g., the second set of content items are not associated with one or more ongoing experiments). Alternatively and/or additionally, the second set of content items may be selected from the first plurality of content items based upon a determination that the second set of content items are not ghost content items with respect to the first client device (e.g., the first client device is not included in a control group associated with a content item of the second set of content items).

At 410, a third plurality of content items, that are not ghost content items, of the second plurality of content items may be selected for presentation via the first client device. For example, the third plurality of content items may not comprise the one or more first ghost content items. In some examples, a third quantity of content items of the third plurality of content items may be equal to the first quantity of content items associated with the first request for content. Alternatively and/or additionally, the third plurality of content items may be associated with a third plurality of rankings.

In some examples, a fourth plurality of content items of the second plurality of content items that are not the one or more first ghost content items may be identified. A fourth plurality of rankings associated with the fourth plurality of content items may be determined based upon the second plurality of rankings associated with the second plurality of content items and/or the one or more first rankings associated with the one or more first ghost content items. In some examples, the one or more first ghost content items may be removed from the second plurality of content items to determine the fourth plurality of content items.

In an example, the second plurality of content items may comprise 10 content items and/or the second plurality of rankings may comprise rankings #1-#10 associated with the second plurality of content items. The one or more first ghost content items may comprise the first content item (e.g., a ghost content item) associated with a first ranking (e.g., ranking #1) of the second plurality of rankings. The one or more first ghost content items may comprise a second ghost content item associated with a second ranking (e.g., ranking #3) of the second plurality of rankings. The one or more first rankings may comprise the first ranking (e.g., ranking #1) associated with the first content item and/or the second ranking (e.g., ranking #3) associated with the second ghost content item. A third content item (that is not a ghost content item of the one or more first ghost content items) may be associated with a third ranking (e.g., ranking #2) of the second plurality of rankings. The third ranking (e.g., ranking #2) may be one ranking beneath the first ranking (e.g., ranking #1) associated with the first content item. A fourth content item (that is not a ghost content item of the one or more first ghost content items) may be associated with a fourth ranking (e.g., ranking #4) of the second plurality of rankings. The fourth ranking (e.g., ranking #4) may be one ranking beneath the second ranking (e.g., ranking #3) associated with the second ghost content item.

The fourth plurality of content items that are not the one or more first ghost content items may be identified based upon the second plurality of content items and/or the one or more first ghost content items. For example, the fourth plurality of content items may comprise content items of the second plurality of content items excluding the first content item and/or the second ghost content item. In the example where the second plurality of content items comprises 10 content items, the fourth plurality of content items may comprise 8 content items and/or the fourth plurality of rankings associated with the fourth plurality of content items may comprise 8 rankings (e.g., rankings #1-#8) associated with the fourth plurality of content items. The third content item may be associated with a fifth ranking (e.g., ranking #1) of the fourth plurality of rankings that matches the first ranking (e.g., ranking #1), associated with the first content item, of the second plurality of rankings. The fifth ranking (e.g., ranking #1) associated with the third content item may match the first ranking (e.g., ranking #1) due to the first content item being removed from the second plurality of content items to determine the fourth plurality of content items and/or due to the third ranking (e.g., ranking #2) of the third content item being one ranking beneath the first ranking (e.g., ranking #1) in the second plurality of rankings. For example, by removing the first content item from the second plurality of content items to determine the fourth plurality of content items, a next content item (e.g., the third content item that is one ranking beneath the first content item) may take the place of the first content item as ranking #1. The fourth content item may be associated with a sixth ranking (e.g., ranking #3) of the fourth plurality of rankings that matches the second ranking (e.g., ranking #3), associated with the second ghost content item, of the second plurality of rankings.

In some examples, the third plurality of content items may be selected from the fourth plurality of content items based upon the fourth plurality of rankings and/or the first quantity of content items. For example, the third plurality of content items may be selected by selecting content items, amounting to the first quantity of content items, from the fourth plurality of content items based upon the fourth plurality of rankings. In some examples, the third plurality of rankings associated with the third plurality of content items may be higher than other rankings of the fourth plurality of rankings. For example, the third plurality of content items may be selected by selecting highest ranked content items, amounting to the first quantity of content items, from the fourth plurality of content items.

Alternatively and/or additionally, the third plurality of content items may be selected from the second plurality of content items based upon the second plurality of rankings, the one or more first ghost content items and/or the first quantity of content items. For example, the third plurality of content items may be selected by selecting content items that are not ghost content items from the second plurality of content items based upon the second plurality of rankings, where the content items selected amount to the first quantity of content items.

In an example, the third plurality of content items may comprise the third content item, the fourth content item and/or one or more other content items of the fourth plurality of content items. The third plurality of rankings may comprise the fifth ranking (e.g., ranking #1) associated with the third content item, the sixth ranking (e.g., ranking #3) associated with the fourth content item and/or one or more other rankings associated with the one or more other content items.

At 412, a first ghost impression indicator associated with the first content item of the one or more first ghost content items may be stored based upon a determination that the first ranking (e.g., ranking #1), of the one or more first rankings, associated with the first content item, matches the fifth ranking (e.g., ranking #1) of the third plurality of rankings. Alternatively and/or additionally, a second ghost impression indicator associated with the second ghost content item may be stored based upon a determination that the second ranking (e.g., ranking #3), of the one or more first rankings, associated with the second ghost content item, matches the sixth ranking (e.g., ranking #3) of the third plurality of rankings.

In some examples, one or more content items of the third plurality of content items may be transmitted to the first client device responsive to selecting the third plurality of content items for presentation via the first client device. Alternatively and/or additionally, one or more content items of the third plurality of content items may be presented via the first client device. For example, one or more content items of the third plurality of content items may be presented via the first internet resource on the first client device, such as while the first internet resource is accessed and/or displayed.

In some examples, the third content item may be transmitted to the first client device responsive to selecting the third plurality of content items for presentation via the first client device. The third content item may be presented via the first client device. For example, the third content item may be presented via the first internet resource on the first client device, such as while the first internet resource is accessed and/or displayed. In some examples, the first ghost impression indicator may be generated and/or stored responsive to selecting the third content item for presentation via the first client device. Alternatively and/or additionally, the first ghost impression indicator associated with the first content item may be generated and/or stored responsive to transmitting the third content item to the first client device. Alternatively and/or additionally, the first ghost impression indicator associated with the first content item may be generated and/or stored responsive to presenting the third content item via the first client device. For example, the first ghost impression indicator may be generated and/or stored responsive to a determination that the first client device is associated with the second group and/or a determination that the fifth ranking associated with the third content item (that is presented via the first client device) matches the first ranking associated with the first content item.

Alternatively and/or additionally, the first ghost impression indicator associated with the first content item may be generated and/or stored responsive to presenting and/or displaying at least a threshold proportion of the third content item via the first client device (e.g., the threshold proportion may correspond to 50% of the third content item and/or a different proportion of the third content item). For example, the first ghost impression indicator may not be stored responsive to a determination that merely some of the third content item is displayed via the first client device and/or a determination that a proportion of a displayed portion of the third content item does not meet the threshold proportion.

In some examples, impression information associated with presentation of the third plurality of content items via the first client device may be received. In some examples, the impression information may be received from the first client device. Alternatively and/or additionally, the impression information may be received from a server associated with the first internet resource. In some examples, the impression information may be indicative of one or more content items of the third plurality of content items that are presented and/or displayed via the first client device. For example, the impression information may be indicative of the third content item being presented via the first client device. The first ghost impression indicator may be generated and/or stored responsive to receiving the impression information indicative of the third content item being presented via the first client device.

In some examples, the multiple serve areas of the first internet resource may be associated with presentation of the third plurality of content items via the first internet resource. The multiple serve areas may be associated with ranking values. For example, a first serve area of the multiple serve areas may correspond to a ranking value #1, a second serve area of the multiple serve areas may correspond to a ranking value #2, a third serve area of the multiple serve areas may correspond to a ranking value #3, etc.

In an example, a content item (e.g., the third content item) associated with the ranking value #1 may be displayed via the first serve area, a content item associated with the ranking value #2 may be displayed via the second serve area, a content item (e.g., the fourth content item) associated with the ranking value #3 may be displayed via the third serve area, etc. The first ranking (of the one or more first rankings) associated with the first content item may match the ranking value #1 associated with the first serve area. Alternatively and/or additionally, the second ranking (of the one or more first rankings) associated with the second ghost content item may match the ranking value #3 associated with the third serve area.

Accordingly, the first ghost impression indicator associated with the first content item may be generated and/or stored responsive to a determination that the first serve area is displayed and/or a determination that the third content item is displayed via the first serve area. For example, the first ghost impression indicator may be generated and/or stored based upon a determination that the ranking value #1 associated with the first serve area matches the first ranking associated with the first content item. Alternatively and/or additionally, the second ghost impression indicator associated with the second ghost content item may be generated and/or stored responsive to a determination that the third serve area is displayed and/or a determination that the fourth content item is displayed via the third serve area. For example, the second ghost impression indicator may be generated and/or stored based upon a determination that the ranking value #3 associated with the third serve area matches the second ranking associated with the second ghost content item.

In some examples, the multiple serve areas may be automatically visible and/or displayed upon the first internet resource being accessed. For example, the third plurality of content items may be automatically visible and/or displayed upon the first internet resource being accessed. Accordingly, the first ghost impression indicator and/or the second ghost impression indicator may be generated and/or stored responsive to the first internet resource being accessed and/or responsive to the third plurality of content items being presented and/or displayed (e.g., presented and/or displayed concurrently and/or simultaneously).

Alternatively and/or additionally, one or more serve areas of the multiple serve areas may not be visible and/or displayed upon the first internet resource being accessed. In an example where the first internet resource corresponds to the first web page, the one or more serve areas may be positioned within one or more lower parts of the first web page that are not visible and/or displayed upon the first web page being accessed (e.g., merely one or more parts of the first web page, higher than the one or more lower parts may be visible and/or displayed upon the first web page being accessed). The one or more serve areas of the multiple serve areas may become visible and/or displayed responsive to scrolling past content of the first web page to display the one or more lower parts of the first web page. Accordingly, in an example where the first serve area and the third serve area are displayed separately, the first ghost impression indicator associated with the first content item may be generated and/or stored responsive to a determination that a part of the first web page that comprises the first serve area is displayed and/or a determination that the third content item is displayed via the first serve area. Alternatively and/or additionally, the second ghost impression indicator associated with the second ghost content item may be generated and/or stored responsive to a determination that a part of the first web page that comprises the third serve area is displayed and/or a determination that the fourth content item is displayed via the third serve area.

In an example, the first internet resource may present the list of items (e.g., one or more of the list of news items, the list of search items, the list of social media items, the list of blog items, the list of videos, the list of songs, etc.). The multiple serve areas associated with presentation of the third plurality of content items may be distributed throughout the list of items. Accordingly, one or more content items of the third plurality of content items may each be displayed and/or consumed by scrolling through the list of items and/or through one or more serve areas of the multiple serve areas.

In some examples, the first ghost impression indicator may be indicative of transmission of the third content item to the first client device. Alternatively and/or additionally, the first ghost impression indicator may be indicative of presentation of the third content item via the first client device. Alternatively and/or additionally, the first ghost impression indicator may comprise at least one of the first identifier associated with the first client device, an indication of the first content item, an indication of the third content item, an indication of the first serve area in which the third content item is presented, a time that the third content item is transmitted to the first client device, a time that the third content item is presented via the first client device, etc.

In some examples, impression indicators associated with transmission and/or presentation of content items of the third plurality of content items may be stored. For example, an impression indicator associated with the third content item may be stored responsive to the third content item being presented and/or transmitted (e.g., both the impression indicator associated with the third content item and the first ghost impression indicator associated with the first content item may be stored responsive to the third content item being presented and/or transmitted). Alternatively and/or additionally, an impression indicator associated with the fourth content item may be stored responsive to the fourth content item being presented and/or transmitted (e.g., both the impression indicator associated with the fourth content item and the second ghost impression indicator associated with the second ghost content item may be stored responsive to the fourth content item being presented and/or transmitted).

In some examples, a first set of impression indicators associated with the first content item may be identified. In some examples, the first set of impression indicators may be associated with a third set of client devices that received and/or presented the first content item, such as during the first experiment. For example, the third set of client devices may correspond to client devices of the first set of client devices associated with the first group. In some examples, an impression indicator of the first set of impression indicators may be indicative of selection of the first content item for presentation via a client device of the third set of client devices, transmission of the first content item to a client device of the third set of client devices and/or presentation of the first content item via a client device of the third set of client devices. In some examples, the first set of impression indicators may be stored in a first impression indicator data structure associated with the first group. For example, responsive to the first content item being transmitted to a client device of the third set of client devices and/or being presented via the client device, an impression indicator of the first set of impression indicators may be stored in the first impression data structure. Alternatively and/or additionally, an impression indicator of the first set of impression indicators may be stored in a user profile associated with the impression indicator. In some examples, the first set of impression indicators may be used to determine (and/or keep track of) client devices that received and/or presented the first content item, such as during the first experiment.

In some examples, a first set of ghost impression indicators (comprising the first ghost impression indicator) associated with the first content item may be identified. In some examples, the first set of ghost impression indicators may be associated with a fourth set of client devices. In some examples, the first set of ghost impression indicators may comprise the first ghost impression indicator associated with the first client device and/or the fourth set of client devices may comprise the first client device. In some examples, a ghost impression indicator of the first set of ghost impression indicators may be associated with (and/or indicative of) a selection of a content item for presentation via a client device of the fourth set of client devices based upon an auction and/or a bidding process, transmission of the content item to the client device and/or presentation of the content item via the client device, where a ranking of the content item (after the first content item is removed from content items selected in the auction) matches a ranking of the first content item in the auction.

In an example, a ghost impression indicator of the first set of ghost impression indicators may be generated and/or stored responsive to (and/or based upon) a content item being selected for presentation via a client device of the fourth set of client devices based upon an auction and/or a bidding process. In the example, the ghost impression indicator may be generated and/or stored based upon a determination that a ranking of the content item (after the first content item is removed from content items selected in the auction) matches a ranking of the first content item in the auction.

In an example, a ghost impression indicator of the first set of ghost impression indicators may be generated and/or stored responsive to (and/or based upon) a content item being selected for presentation via a client device of the fourth set of client devices based upon an auction and/or a bidding process and the content item being transmitted to the client device. In the example, the ghost impression indicator may be generated and/or stored based upon a determination that a ranking of the content item (after the first content item is removed from content items selected in the auction) matches a ranking of the first content item in the auction.

In an example, a ghost impression indicator of the first set of ghost impression indicators may be generated and/or stored responsive to (and/or based upon) a content item being selected for presentation via a client device of the fourth set of client devices based upon an auction and/or a bidding process and the content item being presented via the client device. In the example, the ghost impression indicator may be generated and/or stored based upon a determination that a ranking of the content item (after the first content item is removed from content items selected in the auction) matches a ranking of the first content item in the auction.

In some examples, the first set of ghost impression indicators may be stored in a first ghost impression indicator data structure associated with the second group. Alternatively and/or additionally, a ghost impression indicator of the first set of ghost impression indicators may be stored in a user profile associated with the ghost impression indicator.

In some examples, the first set of ghost impression indicators may be used to determine (and/or keep track of) instances where client devices of the second group would have received and/or presented the first content item if the first content item was not removed from content items selected in auctions and/or bidding processes associated with the second group.

In some examples, first conversion information associated with the third set of client devices (that received the first content item) may be determined. First activity associated with the third set of client devices may be analyzed to determine the first conversion information. In some examples, the third set of client devices and/or the first activity associated with the third set of client devices may be identified based upon the first set of impression indicators. The first conversion information may comprise a first conversion rate associated with the first entity, a first quantity of conversion events associated with the first entity, a first revenue associated with the first entity, etc.

In some examples, a first set of conversion events associated with the first entity may be determined by analyzing the first activity associated with the third set of client devices. In some examples, a conversion event of the first set of conversion events may correspond to one or more of a purchase of a product of one or more products associated with the first entity, a purchase of a service of one or more services associated with the first entity, subscribing to (and/or signing up for) a service of one or more services associated with the first entity, contacting the first entity (e.g., contacting the first entity via one or more of email, phone, etc.), a selection of a content item associated with the first entity (such as the first content item), an interaction with a content item associated with the first entity (such as the first content item), accessing a web page associated with the first entity, etc.

In some examples, conversion identification information may be retrieved from a database and/or may be received from the device associated with the first entity. The conversion identification information may be indicative of one or more actions that constitute an occurrence of a conversion event (with respect to the first entity and/or the advertisement campaign). For example, conversion identification information may be indicative of a set of actions, wherein an action of the set of actions constitute a conversion event (e.g., the set of actions may comprise one or more of a purchase of a product of the one or more products associated with the first entity, a purchase of a service of the one or more services associated with the first entity, subscribing to (and/or signing up for) a service of the one or more services associated with the first entity, contacting the first entity (e.g., contacting the first entity via one or more of email, phone, etc.), a selection of a content item associated with the first entity, an interaction with a content item associated with the first entity, accessing a web page associated with the first entity, etc.).

In some examples, the first activity associated with the third set of client devices may be analyzed based upon the conversion identification information to determine the first set of conversion events. For example, a conversion event of the first set of conversion events may be identified and/or determined by detecting a selection of a content item associated with the first entity using a client device of the third set of client devices. Alternatively and/or additionally, a conversion event of the first set of conversion events may be identified and/or determined by detecting an interaction with a content item associated with the first entity using a client device of the third set of client devices. Alternatively and/or additionally, a conversion event of the first set of conversion events may be identified and/or determined by detecting a web page associated with the first entity being accessed using a client device of the third set of client devices. Alternatively and/or additionally, a conversion event of the first set of conversion events may be identified and/or determined by detecting a purchase of a product and/or a service associated with the first entity using a client device of the third set of client devices. Alternatively and/or additionally, a conversion event of the first set of conversion events may be identified and/or determined by detecting a subscription to a service associated with the first entity using a client device of the third set of client devices.

Alternatively and/or additionally, a third set of user profiles associated with the third set of client devices may be analyzed to determine the first set of conversion events. For example, the third set of user profiles may be indicative of the first activity associated with the third set of client devices. The third set of user profiles may be analyzed based upon the conversion identification information to determine the first set of conversion events. For example, a conversion event of the first set of conversion events may be identified and/or determined by identifying, within a user profile of the third set of user profiles, an indication of a selection of a content item associated with the first entity. Alternatively and/or additionally, a conversion event of the first set of conversion events may be identified and/or determined by identifying, within a user profile of the third set of user profiles, an indication of an interaction with a content item associated with the first entity. Alternatively and/or additionally, a conversion event of the first set of conversion events may be identified and/or determined by identifying, within a user profile of the third set of user profiles, an indication of a web page associated with the first entity being accessed. Alternatively and/or additionally, a conversion event of the first set of conversion events may be identified and/or determined by identifying, within a user profile of the third set of user profiles, an indication of a purchase of a product and/or a service associated with the first entity. Alternatively and/or additionally, a conversion event of the first set of conversion events may be identified and/or determined by identifying, within a user profile of the third set of user profiles, an indication of a subscription to a service associated with the first entity.

Alternatively and/or additionally, messages (e.g., at least one of instant messages, emails, etc.) associated with the third set of client devices may be analyzed to identify one or more exemplary messages indicative of one or more of a purchase of a product associated with the first entity (e.g., a receipt, a proof of purchase, a confirmation email, etc.), a purchase of a service associated with the first entity (e.g., a receipt, a proof of purchase, a confirmation email, etc.), a subscription to a service associated with the first entity, a confirmation that indicates a client device and/or a user contacted the first entity and/or signed up for a service associated with the first entity, etc. For example, a conversion event may be determined based upon the one or more exemplary messages.

Alternatively and/or additionally, conversion information may be received from a device associated with the first entity. The conversion information may be indicative of client devices of the third set of client devices associated with conversion events. The first set of conversion events may be determined based upon the conversion information.

In some examples, the first set of conversion events may correspond to conversion events performed after transmission of the first content item to the third set of client devices. For example, a conversion event of the first set of conversion events may be performed via a client device of the third set of client devices after the first content item is transmitted to the client device and/or presented via the client device. Alternatively and/or additionally, the first activity (that is analyzed to determine the first set of conversion events) may correspond to activity of the third set of client devices performed after transmission of the first content item. For example, for each client device of the third set of client devices, activity may be analyzed that occurred after the first content item is transmitted to the client device and/or presented via the client device. In an example, a first exemplary client device of the third set of client devices may receive and/or present the first content item at a first exemplary time. The first activity that is analyzed to determine the first set of conversion events may comprise activity associated with the first exemplary client device that occurred after the first exemplary time. A second exemplary client device of the third set of client devices may receive and/or present the first content item at a second exemplary time. The first activity that is analyzed to determine the first set of conversion events may comprise activity associated with the second exemplary client device that occurred after the second exemplary time.

Embodiments are contemplated where the first activity (that is analyzed to determine the first set of conversion events) comprises activity of the third set of client devices performed before the first content item is transmitted to the third set of client devices. For example, a conversion event of the first set of conversion events may be performed via a client device of the third set of client devices before the first content item is transmitted to the client device and/or presented via the client device.

In some examples, the first quantity of conversion events of the first conversion information may be determined based upon the first set of conversion events. For example, the first quantity of conversion events may correspond to a quantity of the first set of conversion events.

In some examples, the first conversion rate of the first conversion information may be determined based upon the first set of conversion events. The first conversion rate may correspond to a proportion of client devices of the third set of client devices that performed a conversion event associated with the first entity (e.g., the first conversion rate may indicate that 30% of the third set of client devices performed a conversion event associated with the first entity). Alternatively and/or additionally, the first conversion rate may correspond to a proportion of client devices of the third set of client devices that performed a conversion event associated with the first entity after receiving and/or presenting the first content item (e.g., the first conversion rate may indicate that 30% of the third set of client devices performed a conversion event associated with the first entity after receiving and/or presenting the first content item). Alternatively and/or additionally, the first conversion rate may correspond to a rate at which conversion events are performed by client devices of the third set of client devices (e.g., a quantity of conversion events performed by the third set of client devices per unit of time). Alternatively and/or additionally, the first conversion rate may correspond to an average quantity of conversion events performed by each client device of the third set of client devices (e.g., 0.6 conversion events per client device).

In some examples, the first revenue of the first conversion information may be determined based upon the first set of conversion events and/or the first activity of the third set of client devices. The first revenue may correspond to an amount of revenue and/or a predicted amount of revenue associated with the third set of client devices. For example, the first revenue may correspond to an amount of revenue received (by the first entity, for example) as a result of transmitting the first content item to the third set of client devices and/or presenting the first content item via the third set of client devices. In some examples, the first set of conversion events may be analyzed to determine purchases of the first set of conversion events. The first revenue may be determined based upon the purchases. Alternatively and/or additionally, the first set of conversion events may be analyzed to identify one or more conversion events that are indicative of a high probability of a future purchase associated with the first entity. For example, a conversion event of the one or more conversion events may be associated with a client device performing an activity, such as visiting a web page associated with the first entity, that may not directly result in revenue for the first entity, but rather may indicate that a probability that a future purchase will be performed via the client device is higher than a threshold probability. The first revenue may be determined (and/or predicted) based upon the one or more conversion events. Alternatively and/or additionally, the first revenue may correspond to an average revenue. For example, the first revenue may be determined by performing one or more operations (e.g., one or more mathematical operations) using a total revenue (and/or a total predicted revenue) and/or a quantity of client devices of the third set of client devices. In an example where a total revenue (and/or a total predicted revenue) is $3,000 and/or the quantity of client devices of the third set of client devices is 1000 client devices, the first revenue may correspond to $3 per client device of the third set of client devices.

In some examples, second conversion information associated with the fourth set of client devices may be determined. Second activity associated with the fourth set of client devices may be analyzed to determine the second conversion information. In some examples, the fourth set of client devices and/or the second activity associated with the fourth set of client devices may be identified based upon the first set of ghost impression indicators. The second conversion information may comprise a second conversion rate associated with the first entity, a second quantity of conversion events associated with the first entity, a second revenue associated with the first entity, etc.

In some examples, a second set of conversion events associated with the first entity may be determined by analyzing the second activity associated with the fourth set of client devices. In some examples, a conversion event of the second set of conversion events may correspond to one or more of a purchase of a product of one or more products associated with the first entity, a purchase of a service of one or more services associated with the first entity, subscribing to (and/or signing up for) a service of one or more services associated with the first entity, contacting the first entity (e.g., contacting the first entity via one or more of email, phone, etc.), a selection of a content item associated with the first entity, an interaction with a content item of associated with the first entity, accessing a web page associated with the first entity, etc.

In some examples, the second set of conversion events may correspond to conversion events performed after times associated with the first set of ghost impression indicators. For example, the second set of conversion events may correspond to conversion events performed after ghost impression indicators of the first set of ghost impression indicators are generated and/or stored. In an example, a conversion event of the second set of conversion events may be performed via a client device of the fourth set of client devices after a ghost impression indicator associated with the client device, of the first set of ghost impression indicators associated with the first content item, is generated and/or stored. Alternatively and/or additionally, the second activity (that is analyzed to determine the second set of conversion events) may correspond to activity of the fourth set of client devices performed after ghost impression indicators of the first set of ghost impression indicators are generated and/or stored. For example, for each client device of the fourth set of client devices, activity may be analyzed that occurred after a ghost impression indicator associated with the client device, of the first set of ghost impression indicators associated with the first content item, is generated and/or stored. In an example, a ghost impression indicator, of the first set of ghost impression indicators, associated with a first exemplary client device of the fourth set of client devices may be generated and/or stored at a first exemplary time. The second activity that is analyzed to determine the second set of conversion events may comprise activity associated with the first exemplary client device that occurred after the first exemplary time. A ghost impression indicator, of the first set of ghost impression indicators, associated with a second exemplary client device of the fourth set of client devices may be generated and/or stored at a second exemplary time. The second activity that is analyzed to determine the second set of conversion events may comprise activity associated with the second exemplary client device that occurred after the second exemplary time.

Embodiments are contemplated where the second activity (that is analyzed to determine the second set of conversion events) comprises activity of the fourth set of client devices performed before ghost impression indicators of the first set of ghost impression indicators are generated and/or stored. For example, a conversion event of the second set of conversion events may be performed via a client device of the fourth set of client devices before a ghost impression indicator associated with the client device, of the first set of ghost impression indicators associated with the first content item, is generated and/or stored.

In some examples, the second quantity of conversion events of the second conversion information may be determined based upon the second set of conversion events. For example, the second quantity of conversion events may correspond to a quantity of the second set of conversion events.

In some examples, the second conversion rate of the second conversion information may be determined based upon the second set of conversion events. The second conversion rate may correspond to a proportion of client devices of the fourth set of client devices that performed a conversion event associated with the first entity (e.g., the second conversion rate may indicate that 10% of the fourth set of client devices performed a conversion event associated with the first entity). Alternatively and/or additionally, the second conversion rate may correspond to a proportion of client devices of the fourth set of client devices that performed a conversion event associated with the first entity after ghost impression indicators associated with the client devices and/or the first content item are stored (e.g., the second conversion rate may indicate that 10% of the fourth set of client devices performed a conversion event associated with the first entity after ghost impression indicators associated with the client devices and/or the first content item are stored). Alternatively and/or additionally, the second conversion rate may correspond to a rate at which conversion events are performed by client devices of the fourth set of client devices (e.g., a quantity of conversion events performed by the fourth set of client devices per unit of time). Alternatively and/or additionally, the second conversion rate may correspond to an average quantity of conversion events performed by each client device of the fourth set of client devices (e.g., 0.2 conversion events per client device).

In some examples, the second revenue of the second conversion information may be determined based upon the second set of conversion events and/or the second activity of the fourth set of client devices. The second revenue may correspond to an amount of revenue and/or a predicted amount of revenue (received by the first entity, for example) associated with the fourth set of client devices. In some examples, the second set of conversion events may be analyzed to determine purchases of the second set of conversion events. The second revenue may be determined based upon the purchases. Alternatively and/or additionally, the second set of conversion events may be analyzed to identify one or more conversion events that are indicative of a high probability of a future purchase associated with the first entity. The second revenue may be determined (and/or predicted) based upon the one or more conversion events.

Alternatively and/or additionally, the second revenue may correspond to an average revenue. For example, the second revenue may be determined by performing one or more operations (e.g., one or more mathematical operations) using a total revenue (and/or a total predicted revenue) and/or a quantity of client devices of the fourth set of client devices.

In an example where a total revenue (and/or a total predicted revenue) is $1,000 and/or the quantity of client devices of the fourth set of client devices is 1000 client devices, the second revenue may correspond to $1 per client device of the fourth set of client devices.

In some examples, a measurement report (e.g., an incrementality report) associated with the content campaign may be generated based upon the first conversion information and/or the second conversion information. In some examples, the measurement report may be transmitted to a third client device associated with the first entity and/or the content campaign.

In some examples, the measurement report may be indicative of the first conversion information and/or the second conversion information. Alternatively and/or additionally, the measurement report may be indicative of at least one of the first conversion rate associated with the first entity, the first quantity of conversion events associated with the first entity, the first revenue associated with the first entity, the second conversion rate associated with the first entity, the second quantity of conversion events associated with the first entity, the second revenue associated with the first entity, etc.

In some examples, a first relationship between the first conversion rate and the second conversion rate may be determined. The first relationship may comprise a difference, a percentage difference and/or a percentage change (and/or a different relationship) between the first conversion rate and the second conversion rate. In an example where the first conversion rate corresponds to 30% of the third set of client devices performing a conversion event associated with the first entity and/or the second conversion rate corresponds to 10% of the fourth set of client devices performing a conversion event associated with the first entity, the first relationship may be indicative of a 20% difference between the first conversion rate and the second conversion rate and/or the first relationship may be indicative of a 200% increase from the second conversion rate to the first conversion rate.

In some examples, a second relationship between the first revenue and the second revenue may be determined. The second relationship may comprise a difference, a percentage difference and/or a percentage change (and/or a different relationship) between the first revenue and the second revenue. In an example where the first revenue corresponds to $3 per client device and/or the second revenue corresponds to $1 per client device, the second relationship may be indicative of a $2 difference between the first revenue and the second revenue and/or the second relationship may be indicative of a 100% increase from the second revenue to the first revenue.

Alternatively and/or additionally, a third relationship between the first quantity of conversion events and the second quantity of conversion events may be determined. The third relationship may comprise a difference, a percentage difference and/or a percentage change (and/or a different relationship between the first quantity of conversion events and the second quantity of conversion events. Alternatively and/or additionally, a first proportion of the first quantity of conversion events with respect to a total quantity of conversion events may be determined. The total quantity of conversion events may correspond to a combination of the first quantity of conversion events and the second quantity of conversion events (e.g., the total quantity of conversion events may correspond to a sum of the first quantity of conversion events and the second quantity of conversion events). Alternatively and/or additionally, a second proportion of the second quantity of conversion events with respect to the total quantity of conversion events may be determined. In an example, the first proportion may be indicative of 92% of conversion events performed by both the third set of client devices and the fourth set of client devices are performed by client devices of the third set of client devices. In the example, the second proportion may be indicative of 8% of conversion events performed by both the third set of client devices and the fourth set of client devices are performed by client devices of the fourth set of client devices. In some examples, the third relationship may be indicative of the first proportion and/or the second proportion.

In some examples, the first relationship between the first conversion rate and the second conversion rate, the second relationship between the first revenue and the second revenue and/or the third relationship between the first quantity of conversion events and the second quantity of conversion events may be included in the measurement report. It may be appreciated that the first conversion rate, the first quantity of conversion events, the first revenue, the second conversion rate, the second quantity of conversion events, the second revenue, the first relationship, the second relationship and/or the third relationship may be representative of an effectiveness of the first content item and/or the content campaign and/or may be representative of an impact that presentation of the first content item has on driving conversion events. Alternatively and/or additionally, including measurements (such as the first conversion rate, the first quantity of conversion events, the first revenue, the second conversion rate, the second quantity of conversion events, the second revenue, the first relationship, the second relationship and/or the third relationship) in the measurement report may enable the first entity to determine and/or understand the effectiveness of the first content item and/or determine and/or understand the impact that presentation of the first content item has on driving conversion events.

In some examples, a plurality of sets of conversion information may be determined. For example, a first set of conversion information of the plurality of sets of conversion information may comprise the first conversion information, the second conversion information, the first relationship, the second relationship and/or the third relationship. In some examples, the plurality of sets of conversion information may be associated with a plurality of sets of conversion parameters. For example, each set of conversion information of the plurality of sets of conversion information may be determined in accordance with a set of conversion parameters of the plurality of sets of conversion parameters. In some examples, a set of conversion parameters of the plurality of sets of conversion parameters may comprise one or more types of activity that constitutes a conversion event associated with the first entity and/or a window of time after storing an impression indicator (and/or a ghost impression indicator) within which activity is analyzed to identify conversion events. In an example, the first set of conversion information may be determined in accordance with a first set of conversion parameters comprising one or more first types of activity and/or a first window of time. A second set of conversion information may be determined in accordance with a second set of conversion parameters (different than the first set of conversion parameters) comprising one or more second types of activity and/or a second window of time. In some examples, the one or more second types of activity may be different than the one or more first types of activity and/or the second window of time may be different than the first window of time. In some examples, the plurality of sets of conversion information may be included in the measurement report. Alternatively and/or additionally, the measurement report may be indicative of the plurality of sets of conversion parameters associated with the plurality of sets of conversion information.

In some examples, a transmission control data structure associated with the first content item and/or the content campaign may be modified based upon the first conversion rate, the first quantity of conversion events, the first revenue, the second conversion rate, the second quantity of conversion events, the second revenue, the first relationship, the second relationship and/or the third relationship. In some examples, transmission of the first content item to client devices may be controlled based upon the transmission control data structure. For example, the first content item may be transmitted to client devices based upon the transmission control data structure. Alternatively and/or additionally, bid values associated with the first content item may be generated based upon the transmission control data structure. Alternatively and/or additionally, client devices may be selected and/or targeted for presentation of the first content item based upon the transmission control data structure. In some examples, the transmission control data structure may comprise the first budget associated with the content campaign, the first target spend pattern associated with the content campaign, an expiration time corresponding to a time that transmission of the first content item to client devices is discontinued, a first frequency cap value corresponding to a rate at which transmissions of the first content item to client devices are performed (e.g., a quantity of transmissions per unit of time) and/or a user targeting profile associated with the content campaign.

In some examples, the first conversion rate may be compared with a threshold conversion rate. Responsive to determining that the first conversion rate exceeds the threshold conversion rate, the transmission control data structure may be modified. For example, responsive to determining that the first conversion rate exceeds the threshold conversion rate, the first budget may be increased, the first target spend pattern may be modified, the first frequency cap value may be increased and/or the expiration time may be extended (e.g., the expiration time may be extended by a duration of time to a later time). Alternatively and/or additionally, responsive to determining that the first conversion rate exceeds the threshold conversion rate, a rate at which the first content item is transmitted to client devices associated with the content system may be increased. Alternatively and/or additionally, a difference between the first conversion rate and the threshold conversion rate may be determined. For example, responsive to determining that the first conversion rate exceeds the threshold conversion rate, the first budget may be increased by an amount that is based upon the difference, the first target spend pattern may be modified based upon the difference, the first frequency cap value may be increased by an amount that is based upon the difference and/or the expiration time may be extended by a duration of time that is based upon the difference. Alternatively and/or additionally, responsive to determining that the first conversion rate exceeds the threshold conversion rate, a rate at which the first content item is transmitted to client devices associated with the content system may be increased by an amount that is based upon the difference.

Alternatively and/or additionally, the first conversion rate may be compared with a second threshold conversion rate. Responsive to determining that the first conversion rate is less than the second threshold conversion rate, the transmission control data structure may be modified. For example, responsive to determining that the first conversion rate is less than the second threshold conversion rate, the first budget may be decreased, the first target spend pattern may be modified, the first frequency cap value may be decreased and/or the expiration time may be changed to an earlier time. Alternatively and/or additionally, responsive to determining that the first conversion rate is less than the second threshold conversion rate, a rate at which the first content item is transmitted to client devices associated with the content system may be decreased (and/or the first content item may not be transmitted to client devices associated with the content system).

In some examples, the first revenue may be compared with a threshold revenue. Responsive to determining that the first revenue exceeds the threshold revenue, the transmission control data structure may be modified. For example, responsive to determining that the first revenue exceeds the threshold revenue, the first budget may be increased, the first target spend pattern may be modified, the first frequency cap value may be increased and/or the expiration time may be extended (e.g., the expiration time may be extended by a duration of time to a later time). Alternatively and/or additionally, responsive to determining that the first revenue exceeds the threshold revenue, a rate at which the first content item is transmitted to client devices associated with the content system may be increased. Alternatively and/or additionally, a difference between the first revenue and the threshold revenue may be determined. For example, responsive to determining that the first revenue exceeds the threshold revenue, the first budget may be increased by an amount that is based upon the difference, the first target spend pattern may be modified based upon the difference, the first frequency cap value may be increased by an amount that is based upon the difference and/or the expiration time may be extended by a duration of time that is based upon the difference. Alternatively and/or additionally, responsive to determining that the first revenue exceeds the threshold revenue, a rate at which the first content item is transmitted to client devices associated with the content system may be increased by an amount that is based upon the difference.

Alternatively and/or additionally, the first revenue may be compared with a second threshold revenue. Responsive to determining that the first revenue is less than the second threshold revenue, the transmission control data structure may be modified. For example, responsive to determining that the first revenue is less than the second threshold revenue, the first budget may be decreased, the first target spend pattern may be modified, the first frequency cap value may be decreased and/or the expiration time may be changed to an earlier time. Alternatively and/or additionally, responsive to determining that the first revenue is less than the second threshold revenue, a rate at which the first content item is transmitted to client devices associated with the content system may be decreased (and/or the first content item may not be transmitted to client devices associated with the content system).

In some examples, the first relationship between the first conversion rate and the second conversion rate may be compared with a first threshold relationship. Responsive to determining that the first conversion rate exceeds the second conversion rate and/or that the first relationship exceeds the first threshold relationship, the transmission control data structure may be modified. For example, responsive to determining that the first conversion rate exceeds the second conversion rate and/or that the first relationship exceeds the first threshold relationship, the first budget may be increased, the first target spend pattern may be modified, the first frequency cap value may be increased and/or the expiration time may be extended (e.g., the expiration time may be extended by a duration of time to a later time). Alternatively and/or additionally, responsive to determining that the first conversion rate exceeds the second conversion rate and/or that the first relationship exceeds the first threshold relationship, a rate at which the first content item is transmitted to client devices associated with the content system may be increased. Alternatively and/or additionally, a difference between the first relationship and the first threshold relationship may be determined. For example, responsive to determining that the first conversion rate exceeds the second conversion rate and/or that the first relationship exceeds the first threshold relationship, the first budget may be increased by an amount that is based upon the difference, the first target spend pattern may be modified based upon the difference, the first frequency cap value may be increased by an amount that is based upon the difference and/or the expiration time may be extended by a duration of time that is based upon the difference. Alternatively and/or additionally, responsive to determining that the first conversion rate exceeds the second conversion rate and/or that the first relationship exceeds the first threshold relationship, a rate at which the first content item is transmitted to client devices associated with the content system may be increased by an amount that is based upon the difference.

In some examples, the second relationship between the first revenue and the second revenue may be compared with a second threshold relationship. Responsive to determining that the first revenue exceeds the second revenue and/or that the second relationship exceeds the second threshold relationship, the transmission control data structure may be modified. For example, responsive to determining that the first revenue exceeds the second revenue and/or that the second relationship exceeds the second threshold relationship, the first budget may be increased, the first target spend pattern may be modified, the first frequency cap value may be increased and/or the expiration time may be extended (e.g., the expiration time may be extended by a duration of time to a later time). Alternatively and/or additionally, responsive to determining that the first revenue exceeds the second revenue and/or that the second relationship exceeds the second threshold relationship, a rate at which the first content item is transmitted to client devices associated with the content system may be increased. Alternatively and/or additionally, a difference between the second relationship and the second threshold relationship may be determined. For example, responsive to determining that the first revenue exceeds the second revenue and/or that the second relationship exceeds the second threshold relationship, the first budget may be increased by an amount that is based upon the difference, the first target spend pattern may be modified based upon the difference, the first frequency cap value may be increased by an amount that is based upon the difference and/or the expiration time may be extended by a duration of time that is based upon the difference. Alternatively and/or additionally, responsive to determining that the first revenue exceeds the second revenue and/or that the second relationship exceeds the second threshold relationship, a rate at which the first content item is transmitted to client devices associated with the content system may be increased by an amount that is based upon the difference.

Alternatively and/or additionally, the first relationship may be compared with a third threshold relationship. Responsive to determining that the first relationship is less than the third threshold relationship, the transmission control data structure may be modified. For example, responsive to determining that the first relationship is less than the third threshold relationship, the first budget may be decreased, the first target spend pattern may be modified, the first frequency cap value may be decreased and/or the expiration time may be changed to an earlier time. Alternatively and/or additionally, responsive to determining that the first relationship is less than the third threshold relationship, a rate at which the first content item is transmitted to client devices associated with the content system may be decreased (and/or the first content item may not be transmitted to client devices associated with the content system).

Alternatively and/or additionally, the second relationship may be compared with a fourth threshold relationship. Responsive to determining that the second relationship is less than the fourth threshold relationship, the transmission control data structure may be modified. For example, responsive to determining that the second relationship is less than the fourth threshold relationship, the first budget may be decreased, the first target spend pattern may be modified, the first frequency cap value may be decreased and/or the expiration time may be changed to an earlier time. Alternatively and/or additionally, responsive to determining that the second relationship is less than the fourth threshold relationship, a rate at which the first content item is transmitted to client devices associated with the content system may be decreased (and/or the first content item may not be transmitted to client devices associated with the content system).

In some examples, a plurality of sets of measurements may be determined based upon the first activity associated with the third set of client devices and/or the second activity associated with the fourth set of client devices. The plurality of sets of measurements may be associated with a plurality of sets of user characteristics. For example, a set of measurements of the plurality of sets of measurements (and/or each set of measurements of the plurality of sets of measurements) may be associated with a set of user characteristics of the plurality of sets of user characteristics.

In some examples, a first set of user characteristics of the plurality of sets of user characteristics may correspond to a first set of user demographics (e.g., at least one of age range, family size, gender, occupation, income, etc.) and/or a first set of historical activity (e.g., at least one of one or more content items accessed and/or selected, one or more web pages accessed, one or more searches performed, etc.). In some examples, a fifth set of client devices, of the third set of client devices and/or the fourth set of client devices, that are associated with the first set of user characteristics may be determined based upon device activity and/or user profiles. For example, device activity and/or user profiles associated with the third set of client devices and/or the fourth set of client devices may be analyzed based upon the first set of user characteristics to identify the fifth set of client devices that are associated with the first set of user characteristics, such as client devices associated with device activity and/or user profiles that match at least a portion of the first set of user demographics and/or at least a portion of the first set of historical activity.

In some examples, a first set of measurements of the plurality of sets of measurements may be associated with the first set of user characteristics. The first set of measurements may be determined by analyzing activity and/or user profiles associated with the fifth set of client devices. The first set of measurements may comprise a first subset of measurements associated with client devices of the fifth set of client devices that received and/or presented the first content item. Alternatively and/or additionally, the first set of measurements may comprise a second subset of measurements associated with client devices of the fifth set of client devices that are associated with ghost impression indicators of the first set of ghost impression indicators associated with the first content item. In some examples, the first subset of measurements may comprise a third conversion rate associated with the first entity, a third quantity of conversion events associated with the first entity and/or a third revenue associated with the first entity. Alternatively and/or additionally, the second subset of measurements may comprise a fourth conversion rate associated with the first entity, a fourth quantity of conversion events associated with the first entity and/or a fourth revenue associated with the first entity. Alternatively and/or additionally, the first set of measurements may comprise a third relationship between the third conversion rate and the fourth conversion rate and/or a fourth relationship between the third revenue and the fourth revenue.

In some examples, the measurement report may be indicative of the plurality of sets of measurements associated with the plurality of sets user characteristics. It may be appreciated that the plurality of sets of measurements may be representative of an effectiveness of the first content item and/or the content item with respect to each set of user characteristics of the plurality of sets of user characteristics. Alternatively and/or additionally, the plurality of sets of measurements may be representative of an impact that presentation of the first content item has on driving conversion events by users associated with each set of user characteristics of the plurality of sets of user characteristics. For example, the plurality of sets of measurements may be representative of the first content item having a first effectiveness when presented via devices associated with the first set of user characteristics and/or the first content item having a second effectiveness when presented via devices associated with a second set of user characteristics. Alternatively and/or additionally, including the plurality of sets of measurements in the measurement report may enable the first entity to determine and/or understand the effectiveness of the first content item with respect to each set of user characteristics of the plurality of sets of user characteristics. Alternatively and/or additionally, including the plurality of sets of measurements in the measurement report may enable the first entity to determine and/or understand the impact that presentation of the first content item has on driving conversion events for users associated with each set of user characteristics of the plurality of sets of user characteristics.

In some examples, the user targeting profile of the transmission control data structure associated with the first content item and/or the content campaign may be modified based upon the plurality of sets of measurements associated with the plurality of sets user characteristics. In some examples, the user targeting profile may comprise a plurality of target values associated with the plurality of sets of user characteristics. For example, the plurality of target values may be used to determine rates of transmission of the first content item to devices associated with the plurality of sets of user characteristics. In an example, the plurality of target values may comprise a first target value associated with the first set of user characteristics and/or a second target value associated with a second set of user characteristics of the plurality of sets of user characteristics. In an example where the first target value is higher than the second target value, a rate of transmission of the first content item to devices associated with the first set of user characteristics may be higher than a rate of transmission of the first content item to devices associated with the second set of user characteristics.

In some examples, a target value of the plurality of target values may be modified based upon a set of measurements of the plurality of measurements. For example, the first target value associated with the first set of user characteristics may be modified based upon the first set of measurements. For example, the first target value may be increased responsive to a determination that the third conversion rate exceeds a conversion rate threshold, a determination that the third revenue exceeds a revenue threshold, a determination that the third conversion rate is greater than the fourth conversion rate, a determination that the third relationship exceeds a third relationship threshold, a determination that the third revenue is greater than the fourth revenue and/or a determination that the fourth relationship exceeds a fourth relationship threshold. Alternatively and/or additionally, the first target value may be decreased responsive to a determination that the third conversion rate is less than the conversion rate threshold, a determination that the third revenue is less than the revenue threshold, a determination that the third conversion rate is less than the fourth conversion rate, a determination that the third relationship is less than the third relationship threshold, a determination that the third revenue is less than the fourth revenue and/or a determination that the fourth relationship is less than the fourth relationship threshold.

In some examples, a rate of transmission of the first content item to devices associated with the first set of user characteristics may be increased responsive to a determination that the third conversion rate exceeds the conversion rate threshold, a determination that the third revenue exceeds the revenue threshold, a determination that the third conversion rate is greater than the fourth conversion rate, a determination that the third relationship exceeds the third relationship threshold, a determination that the third revenue is greater than the fourth revenue and/or a determination that the fourth relationship exceeds the fourth relationship threshold. Alternatively and/or additionally, a rate of transmission of the first content item to devices associated with the first set of user characteristics may be decreased responsive to a determination that the third conversion rate is less than the conversion rate threshold, a determination that the third revenue is less than the revenue threshold, a determination that the third conversion rate is less than the fourth conversion rate, a determination that the third relationship is less than the third relationship threshold, a determination that the third revenue is less than the fourth revenue and/or a determination that the fourth relationship is less than the fourth relationship threshold.

It may be appreciated that modifying the transmission control data structure to control transmission of the first content item based upon the first conversion information, the second conversion information, the first relationship and/or the second relationship may create a closed-loop process allowing results of the first experiment as feedback to tailor parameters of the content system (such as at least one of modifying a rate at which the first content item is transmitted to client devices, modifying a rate at which the first content item is transmitted to client devices associated with a set of user characteristics, modifying the first budget, modifying the first target spend pattern, modifying the first frequency cap value and/or modifying the expiration time). Closed-loop control may reduce errors and produce more efficient operation of a computer system which implements the content system. The reduction of errors and/or the efficient operation of the computer system may improve operational stability and/or predictability of operation. Accordingly, using processing circuitry to implement closed loop control described herein may improve operation of underlying hardware of the computer system.

FIGS. 5A-5J illustrate examples of a system 501 for selecting content items for presentation via devices described with respect to the example method 400 of FIG. 4. A second user, such as user Jennifer (and/or a second client device 500 associated with the second user), may access and/or interact with a service, such as a browser, software, a website, an application, an operating system, an email interface, a messaging interface, a music-streaming application, a video application, etc. that provides a platform for viewing and/or downloading content from a server associated with the content system.

Figure 5A:
FIG. 5A is a component block diagram illustrating an example system for selecting content items for presentation via devices, where a client device presents and/or accesses a first webpage using a browser of the client device.

FIG. 5A illustrates the second client device 500 presenting and/or accessing a first web page 508 using a browser of the second client device 500. The browser may comprise an address bar 502 comprising a web address (e.g., a Uniform Resource Locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
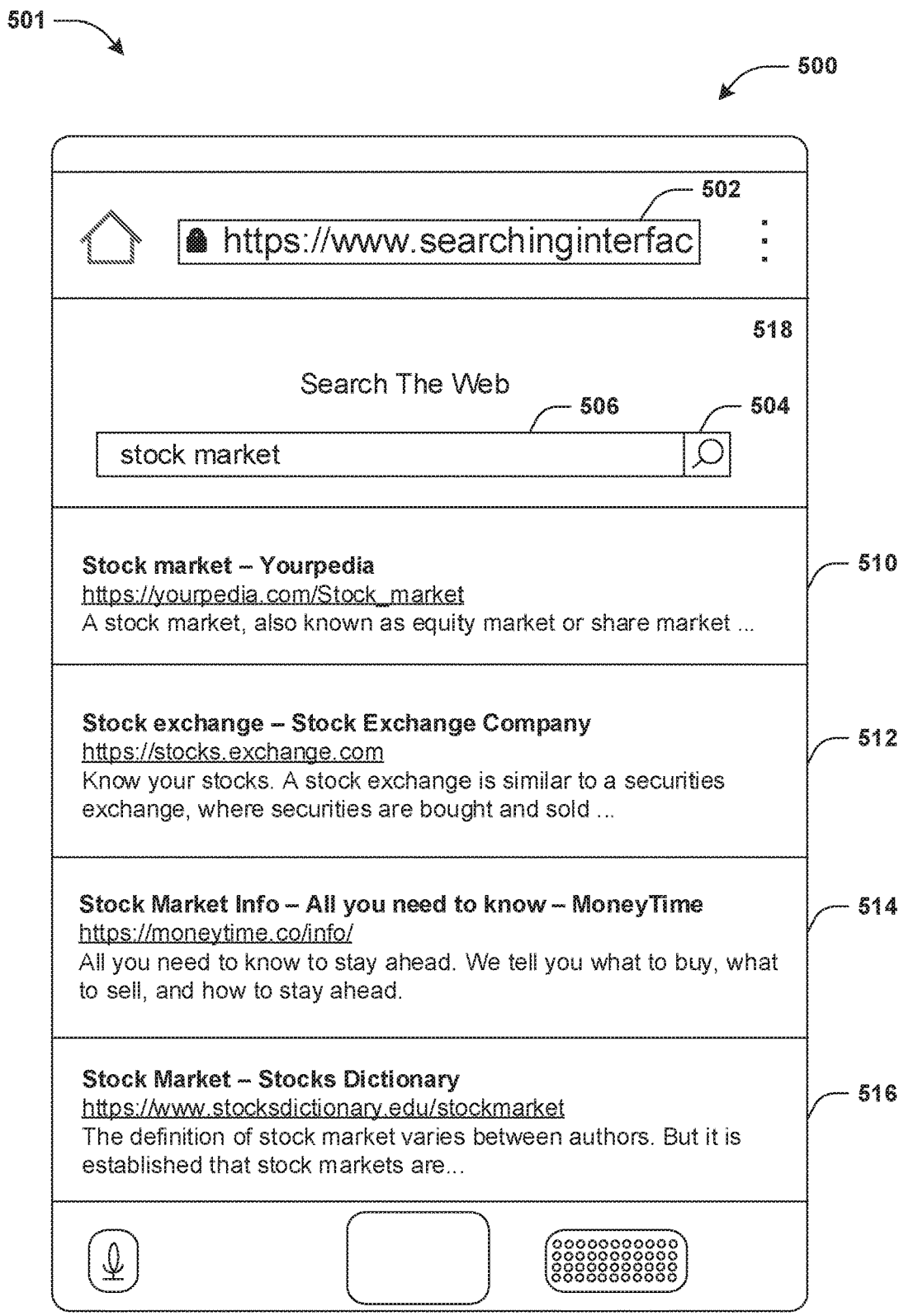
FIG. 5B is a component block diagram illustrating an example system for selecting content items for presentation via devices, where a client device presents a plurality of search results associated with a query using a browser of the client device.

FIG. 5B illustrates the second client device 500 presenting a plurality of search results associated with the query using the browser of the second client device 500. For example, the plurality of search results may be presented within a second web page 518. For example, the plurality of search results may comprise a first search result 510 corresponding to a third web page, a second search result 512 corresponding to a fourth web page 544 (illustrated in FIG. 5H), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
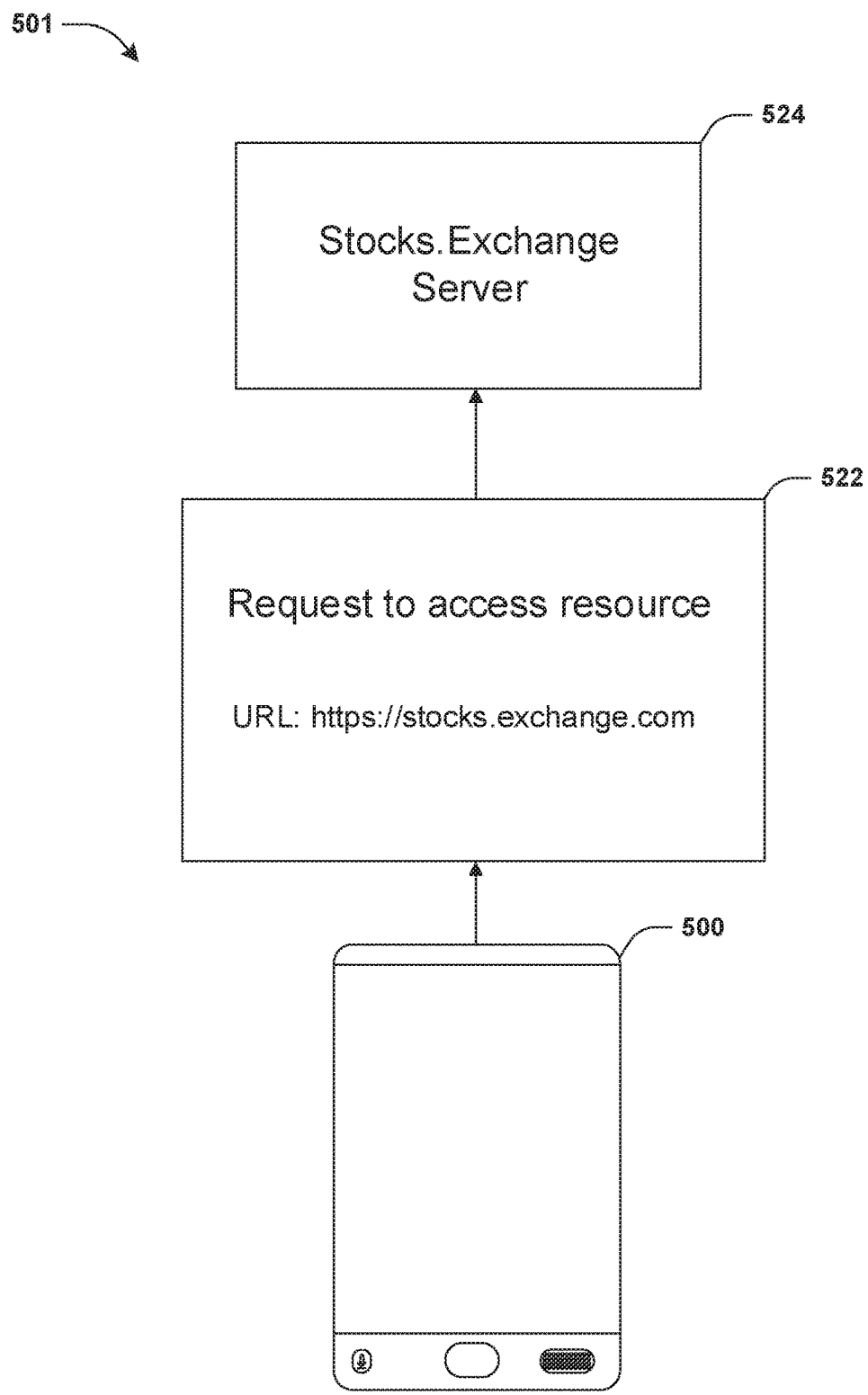
FIG. 5C is a component block diagram illustrating an example system for selecting content items for presentation via devices, where a client device transmits a request to access a resource to a first server.

FIG. 5C illustrates the second client device 500 transmitting a request to access a resource 522 to a first server 524. In some examples, the request to access the resource 522 may be transmitted responsive to the second search result 512 being selected. For example, the resource may correspond to the fourth web page 544. For example, the request to access the resource 522 may comprise an indication of the fourth web page 544 (e.g., a web address "https://stocks.exchange.com"). Alternatively and/or additionally, the first server 524 may be associated with the fourth web page 544.

Figure 5D:
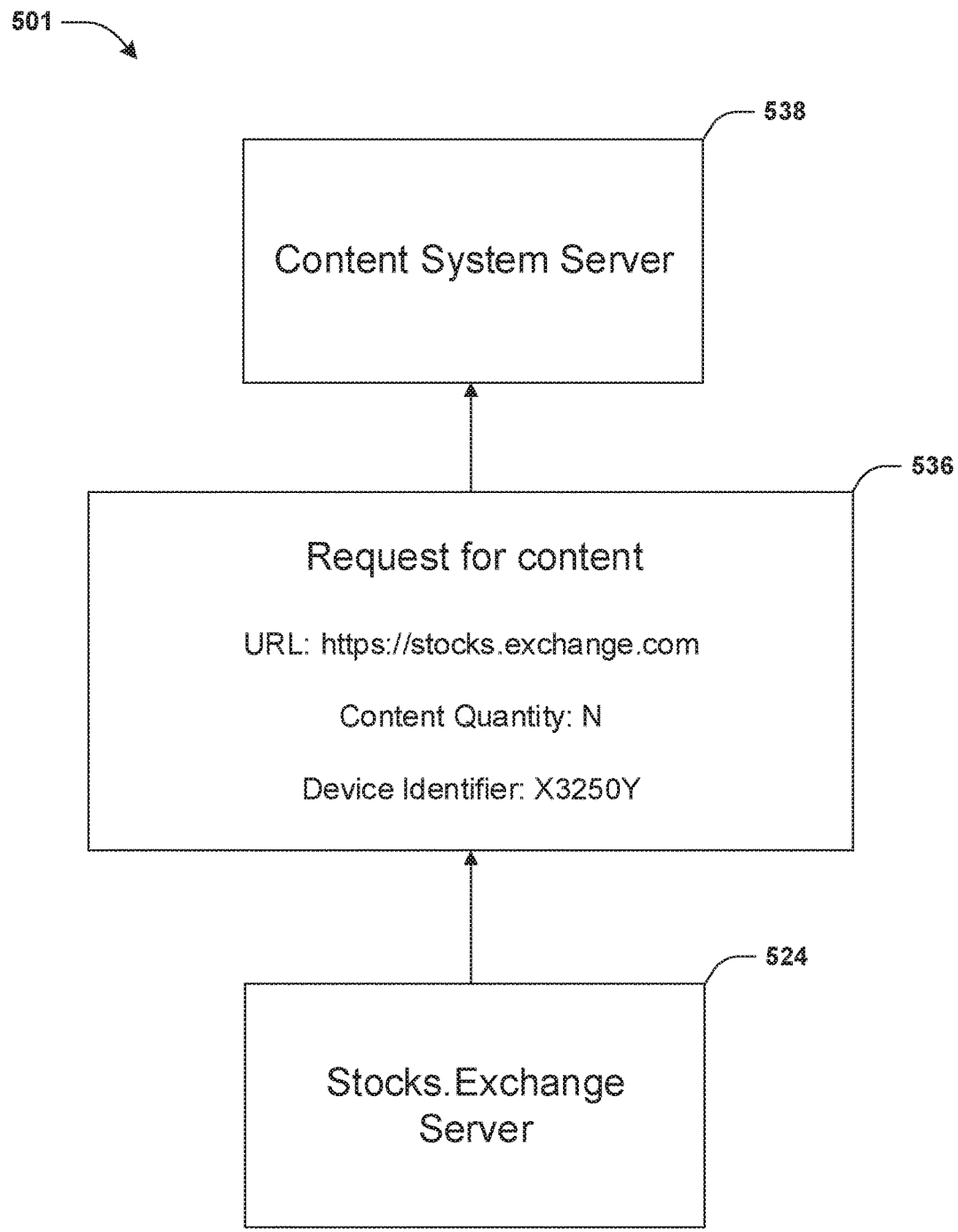
FIG. 5D is a component block diagram illustrating an example system for selecting content items for presentation via devices, where a first server transmits a request for content to a second server associated with a content system.

FIG. 5D illustrates the first server 524 transmitting a second request for content 536 to a second server 538 associated with the content system. In some examples, the second request for content 536 may be transmitted (by the first server 524) responsive to receiving the request to access the resource 522. Alternatively and/or additionally, the second request for content 536 may be transmitted (to the second server 538) by the second client device 500. In some examples, the second request for content 536 may be a request to be provided with multiple content items (e.g., advertisements, images, links, videos, etc.) for presentation via the fourth web page 544. In some examples, the second request for content 536 may comprise an indication of the web address associated with the fourth web page 544, a fourth quantity of content items N associated with the second request for content 536 and/or a device identifier (e.g., "X3250Y") associated with the second client device 500.

Figure 5E:
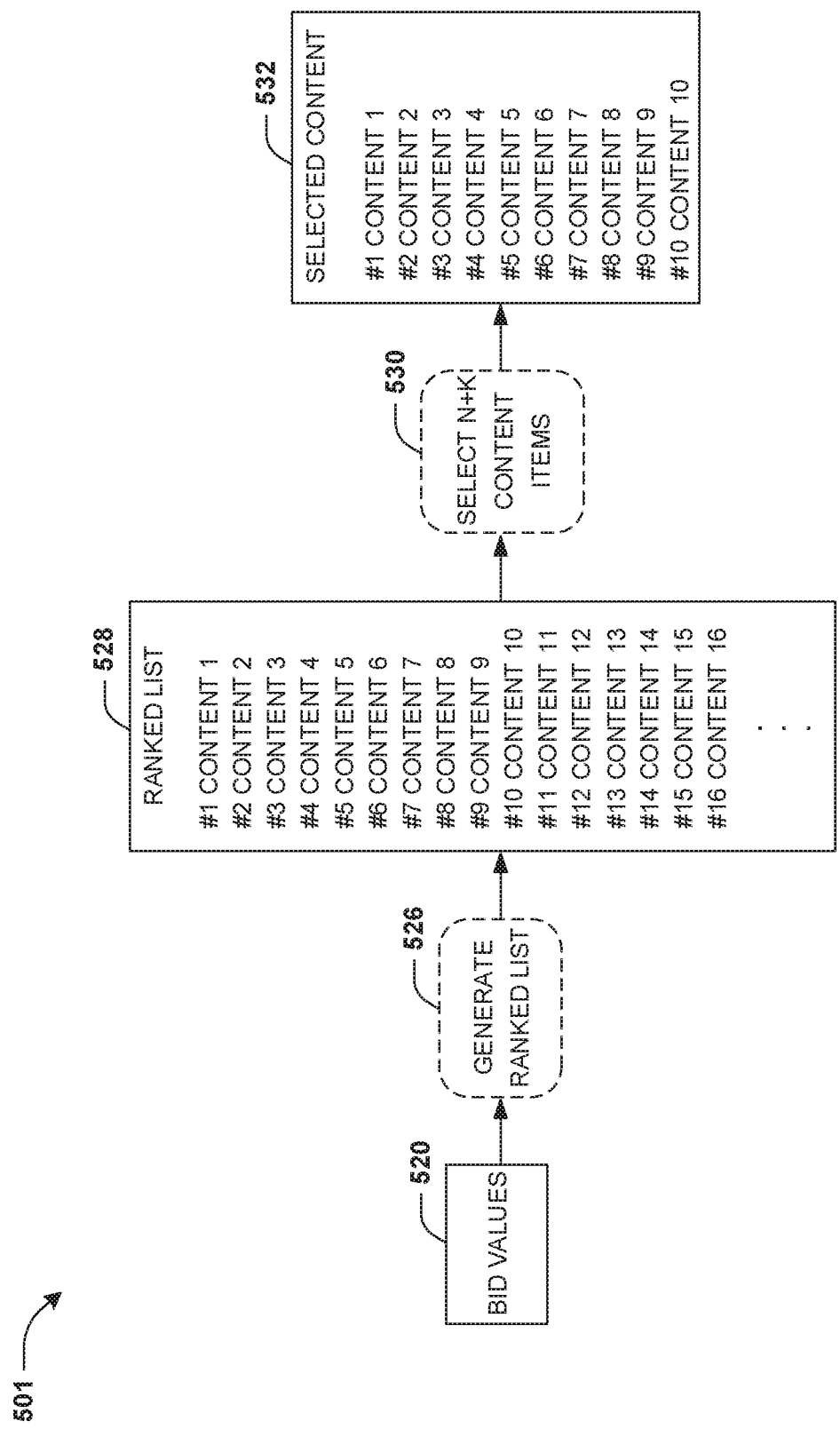
FIG. 5E is a component block diagram illustrating an example system for selecting content items for presentation via devices, where content items are selected based upon bid values and/or rankings.

FIG. 5E illustrates content items being selected based upon bid values and/or rankings. In some examples, one or more operations 526 may be performed to generate a ranked list of content items 528 based upon a second plurality of bid values 520. In some examples, the second plurality of bid values 520 may be associated with a fifth plurality of content items of the content item database. The fifth plurality of content items may comprise content items associated with the second request for content 536. For example, the fifth plurality of content items may be selected from the content item database based upon a determination that content items of the fifth plurality of content items match a topic, format and/or a structure associated with the second request for content 536. In some examples, the one or more operations 526 may comprise determining a fifth plurality of rankings associated with the fifth plurality of content items based upon the second plurality of bid values 520, a plurality of click probabilities associated with the fifth plurality of content items and/or a plurality of content item scores associated with the fifth plurality of content items. For example, the ranked list of content items 528 may be indicative of the fifth plurality of content items and/or the fifth plurality of rankings associated with the fifth plurality of content items.

One or more operations 530 may be performed to select a sixth plurality of content items 532 from the ranked list of content items 528. In some examples, the sixth plurality of content items 532 may have a fifth quantity of content items (e.g., N+K content items). For example, the fifth quantity of content items may be equal to the fourth quantity of content items N plus a second difference in quantity K. The second difference in quantity K may be determined based upon the content item selection data structure and/or the fourth quantity of content items N (such as by using one or more techniques described herein). In some examples, the sixth plurality of content items 532 may be selected from the ranked list of content items 528 based upon the fifth quantity of content items. For example, the sixth plurality of content items 532 may be selected from the ranked list of content items 528 by selecting content items, amounting to the fifth quantity of content items, from the ranked list of content items 528 based upon the fifth plurality of rankings. In some examples, the sixth plurality of content items 532 may be associated with a sixth plurality of rankings (e.g., rankings #1-#10 of the fifth plurality of rankings). In some examples, generation of the ranked list of content items 528 of content items and/or selection of the sixth plurality of content items 532 may be performed in an auction that is performed responsive to receiving the second request for content 536.

Figure 5F:
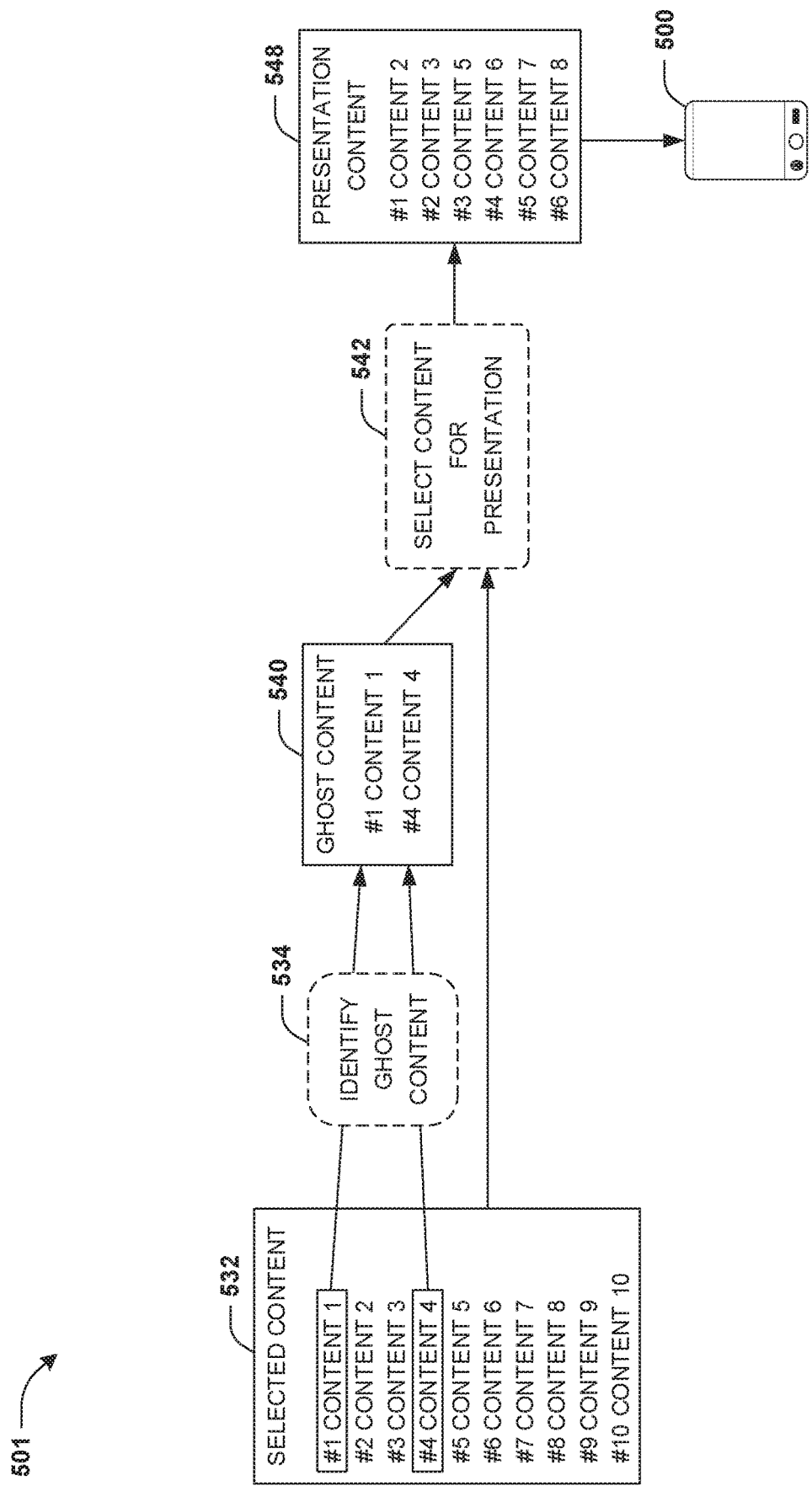
FIG. 5F is a component block diagram illustrating an example system for selecting content items for presentation via devices, where content items are selected for presentation via a client device.

FIG. 5F illustrates content items being selected for presentation via the second client device 500. One or more operations 534 may be performed to identify a first set of ghost content items 540 from amongst the sixth plurality of content items 532. In some examples, the first set of ghost content items 540 may be identified based upon the device identifier, such as using one or more of the techniques presented herein. In some examples, the first set of ghost content items 540 may be associated with a first set of rankings of the sixth plurality of rankings. In an example, the first set of ghost content items 540 may comprise a first ghost content item "CONTENT 1" and/or a second ghost content item "CONTENT 4". The first ghost content item "CONTENT 1" may be associated with a first ranking "#1" of the sixth plurality of rankings and/or the second ghost content item "CONTENT 4" may be associated with a second ranking "#4" of the sixth plurality of rankings. For example, the first ghost content item "CONTENT 1" may be ranked first in the sixth plurality of content items 532 and/or the second ghost content item "CONTENT 4" may be ranked fourth in the sixth plurality of content items 532.

In some examples, one or more operations 542 may be performed to select a seventh plurality of content items 548 that are not ghost content items for presentation via the second client device 500. In some examples, the seventh plurality of content items 548 may be selected from the sixth plurality of content items 532 based upon the first set of ghost content items 540 and/or the fourth quantity of content items N associated with the second request for content 536. For example, the first set of ghost content items 540 may not be included in the seventh plurality of content items 548. Alternatively and/or additionally, a quantity of content items of the seventh plurality of content items 548 may be equal to the fourth quantity of content items N. In some examples, the seventh plurality of content items 548 may be associated with a seventh plurality of rankings. In some examples, the seventh plurality of content items 548 may be transmitted to the second client device 500.

Figure 5G:
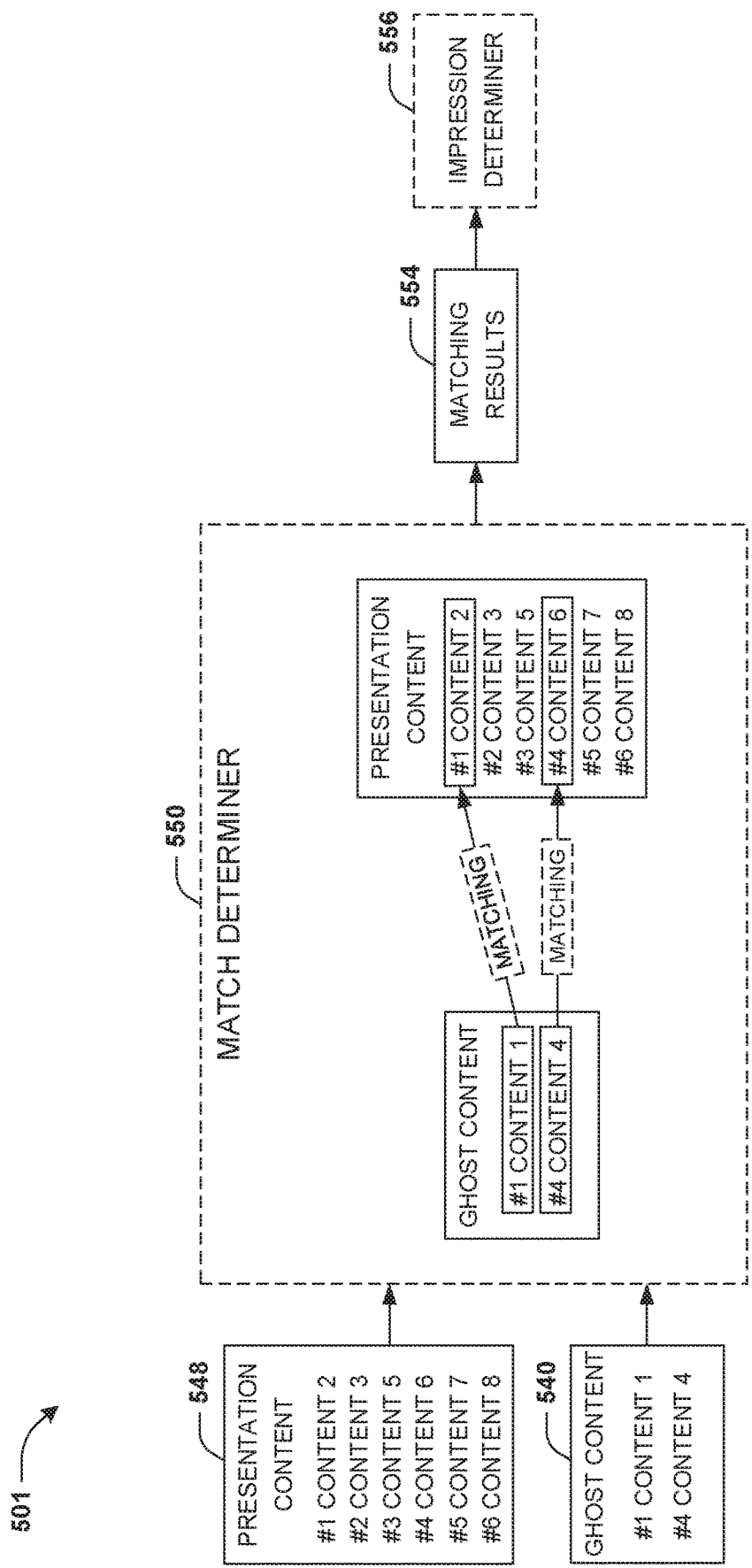
FIG. 5G is a component block diagram illustrating an example system for selecting content items for presentation via devices, where a match determiner determines whether one or more rankings associated with a first set of ghost content items matches one or more rankings associated with a seventh plurality of content items.

FIG. 5G illustrates a match determiner 550 determining whether one or more rankings associated with the first set of ghost content items 540 matches one or more rankings associated with the seventh plurality of content items 548. For example, rank information may be input to the match determiner 550. The rank information may be indicative of the first set of ghost content items 540, the first set of rankings associated with the first set of ghost content items 540, the seventh plurality of content items 548 and/or the seventh plurality of rankings associated with the seventh plurality of content items 548.

In an example, the seventh plurality of content items 548 may comprise a third content item "CONTENT 2" associated with a third ranking "#1" and/or a fourth content item "CONTENT 6" associated with a fourth ranking "#4". For example, the third content item "CONTENT 2" may be ranked first in the seventh plurality of content items 548 and/or the fourth content item "CONTENT 6" may be ranked fourth in the seventh plurality of content items 548. The match determiner 550 may determine that the third ranking "#1" of the third content item "CONTENT 2" matches the first ranking "#1" of the first ghost content item "CONTENT 1". For example, the match determiner 550 may determine that the third ranking "#1" matches the first ranking "#1" based upon both the third ranking "#1" and the first ranking "#1" corresponding to a first ranking value (e.g., "#1"). Alternatively and/or additionally, the match determiner 550 may determine that the fourth ranking "#4" of the fourth content item "CONTENT 6" matches the second ranking "#4" of the second ghost content item "CONTENT 4". For example, the match determiner 550 may determine that the fourth ranking "#4" matches the second ranking "#4" based upon both the fourth ranking "#4" and the second ranking "#4" corresponding to a second ranking value (e.g., "#4").

In some examples, the match determiner 550 may output one or more matching results 554. The one or more matching results 554 may indicate that the third ranking "#1" of the third content item "CONTENT 2" matches the first ranking "#1" of the first ghost content item "CONTENT 1". Alternatively and/or additionally, the one or more matching results 554 may indicate that the fourth ranking "#4" of the fourth content item "CONTENT 6" matches the second ranking "#4" of the second ghost content item "CONTENT 4". In some examples, the one or more matching results 554 may be input to an impression determiner 556. The impression determiner 556 may be configured to generate and/or store one or more impression indications associated with one or more content items of the seventh plurality of content items 548 based upon presentation of the one or more content items via the second client device 500. Alternatively and/or additionally, the impression determiner 556 may be configured to generate and/or store one or more ghost impression indicators associated with the first set of ghost content items 540 based upon presentation of one or more content items of the seventh plurality of content items 548 via the second client device.

It may be appreciated that in an example where an exemplary ranking of an exemplary ghost content item of the first set of ghost content items 540 is less than rankings of the seventh plurality of rankings associated with the seventh plurality of content items 548, a matching result associated with the exemplary ghost content item may not be included in the one or more matching results 554. Alternatively and/or additionally, an indication that the exemplary ranking of the exemplary ghost content item does not match a ranking of the seventh plurality of rankings may be included in the one or more matching results 554. Alternatively and/or additionally, a ghost impression indicator associated with the exemplary ghost content item may not be generated and/or stored responsive to presentation of a content item of the seventh plurality of content items 548 that is associated with a ranking that is different than (and/or greater than) the exemplary ranking associated with the exemplary ghost content item.

Figure 5H:
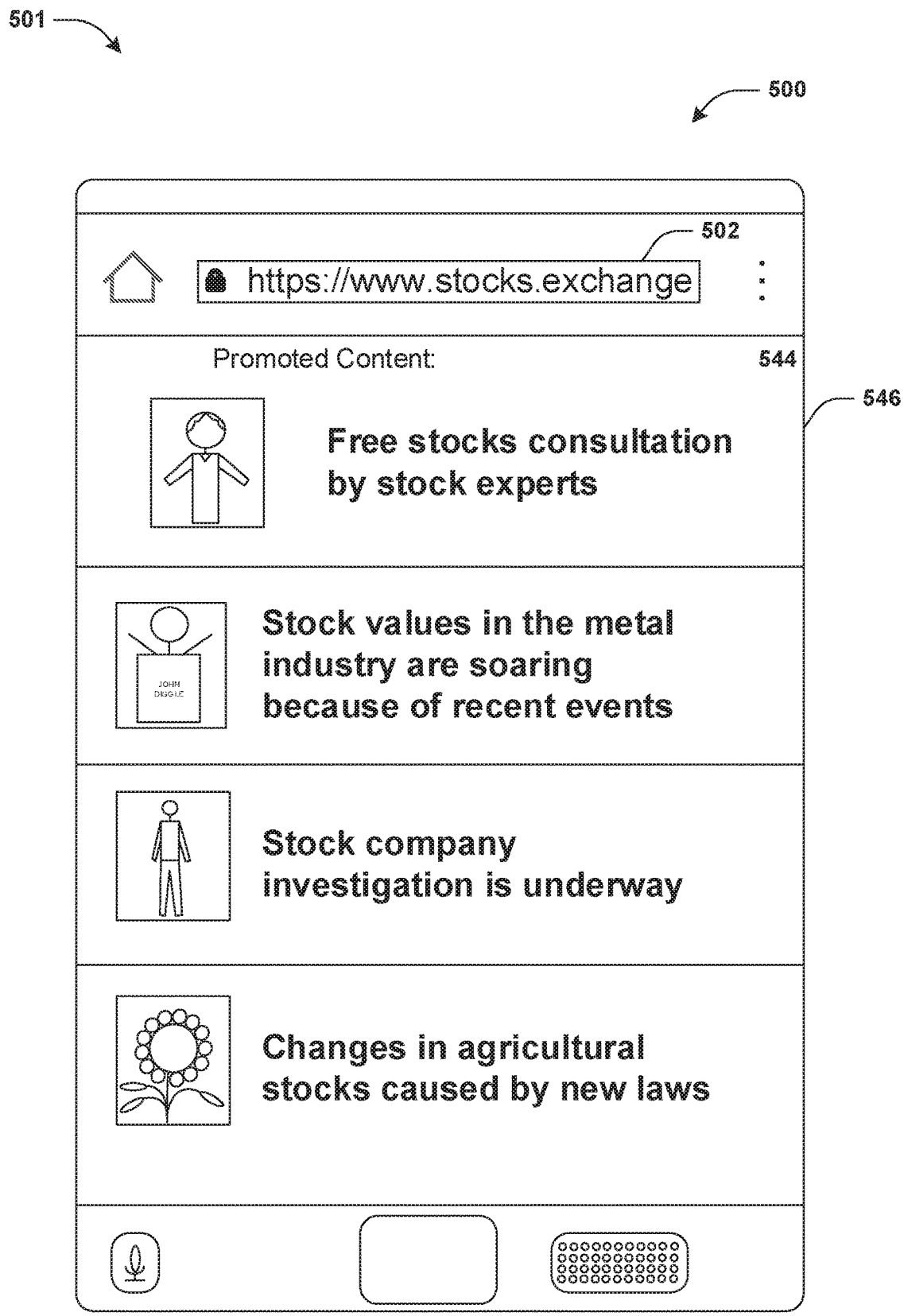
FIG. 5H is a component block diagram illustrating an example system for selecting content items for presentation via devices, where a client device presents and/or accesses a fourth webpage using a browser of the client device.

FIG. 5H illustrates the second client device 500 presenting and/or accessing the fourth web page 544 using the browser of the second client device 500. In some examples, one or more content items of the seventh plurality of content items 548 may be presented via the fourth web page 544 (such as while the fourth web page 544 is accessed by the second client device 500). In some examples, the third content item "CONTENT 2" may be presented via the fourth web page 544. The third content item "CONTENT 2" may have a native content format (e.g., a format associated with native advertising). For example, a structure and/or a format of the third content item "CONTENT 2" may be similar to that of other content of the fourth web page 544, such as a list of items presented by the fourth web page 544. A ghost impression indicator associated with the first ghost content item "CONTENT 1" may be generated and/or stored responsive to the third content item "CONTENT 2" being presented. For example, the ghost impression indicator may be generated and/or stored by the impression determiner 556 based upon the one or more matching results 554 indicating that the third ranking "#1" of the third content item "CONTENT 2" matches the first ranking "#1" of the first ghost content item "CONTENT 1". Alternatively and/or additionally, a first impression indicator associated with the third content item "CONTENT 2" may be generated and/or stored, such as by the impression determiner 556, responsive to the third content item "CONTENT 2" being presented.

In some examples, one or more content items of the seventh plurality of content items 548 may be presented via one or more serving areas of a plurality of serving areas associated with the fourth web page 544. A first serving area 546 of the plurality of serving areas is shown in FIG. 5H. The first serving area 546 may be positioned in a first portion of the fourth web page 544 that is displayed responsive to (and/or upon) the second client device 500 accessing the fourth web page 544. In some examples, the first serving area 546 may be associated with the first ranking value (e.g., "#1") that corresponds to the third ranking "#1" of the third content item "CONTENT 2" and/or the first ranking "#1" of the first ghost content item "CONTENT 1". In some examples, the third content item "CONTENT 2" may be displayed via the first serving area 546. In some examples, the ghost impression indicator associated with the first ghost content item "CONTENT 1" may be generated and/or stored responsive to a content item (e.g., the third content item "CONTENT 2") being presented via the first serving area 546. For example, the ghost impression indicator may be generated and/or stored by the impression determiner 556 based upon a determination that the first ranking value (e.g., "#1") associated with the first serving area 546 matches the first ranking "#1" of the first ghost content item "CONTENT 1".

Figure 5I:
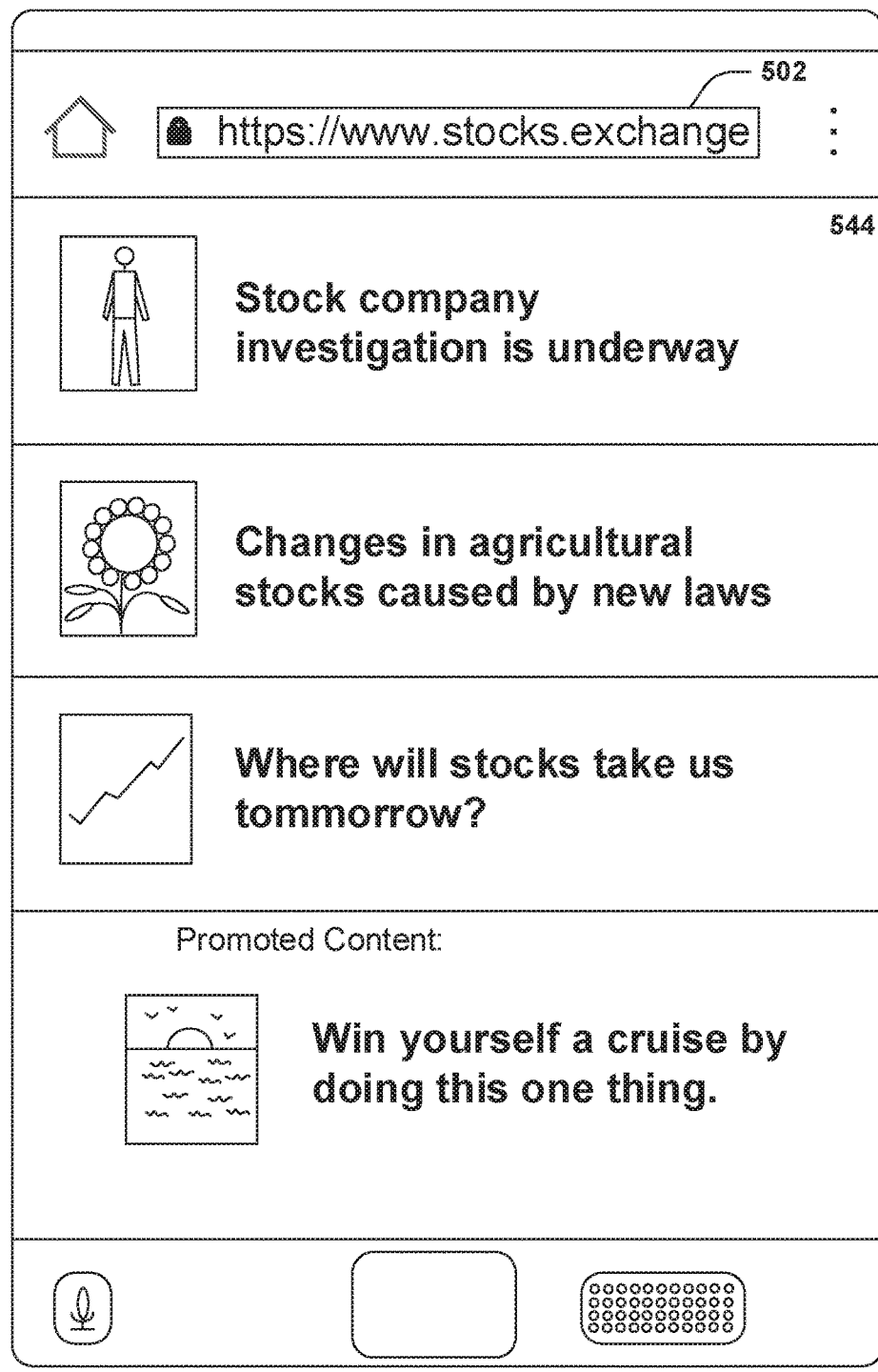
FIG. 5I is a component block diagram illustrating an example system for selecting content items for presentation via devices, where a client device presents and/or accesses a fourth webpage using a browser of the client device.

FIG. 5I illustrates the second client device 500 presenting and/or accessing the fourth web page 544 using the browser of the second client device 500. For example, a second portion of the fourth web page 544 may be displayed responsive to scrolling through some of the fourth web page 544 (e.g., the second portion of the fourth web page 544 may comprise some of the first portion of the fourth web page 544 illustrated in FIG. 5H). In some examples, a second serving area 552 of the plurality of serving areas may be displayed (e.g., the second serving area 552 may be within the second portion of the fourth web page 544). The second serving area 552 may be associated with a second ranking value #2 that matches a fifth ranking "#2" associated with a fifth content item "CONTENT 3" of the seventh plurality of content items 548. For example, the fifth content item "CONTENT 3" may be displayed via the second serving area 552. In some examples, a second impression indicator associated with the fifth content item "CONTENT 3" may be generated and/or stored responsive to the fifth content item "CONTENT 3" being presented.

In an example where the fourth web page 544 is exited and/or other content items of the seventh plurality of content items 548 are not displayed via the fourth web page 544, impression indicators and/or ghost impression indicators associated with serving areas that are not displayed and/or the other content items that are not displayed may not be generated and/or stored.

In some examples, a first conversion event performed by the second client device 500 may be detected. The first conversion event may be associated with an entity associated with the first ghost content item "CONTENT 1". The first conversion event may correspond to a purchase of a product associated with the entity. Alternatively and/or additionally, the first conversion event may correspond to a different type of conversion event associated with the entity (different than a purchase of a product).

Figure 5J:
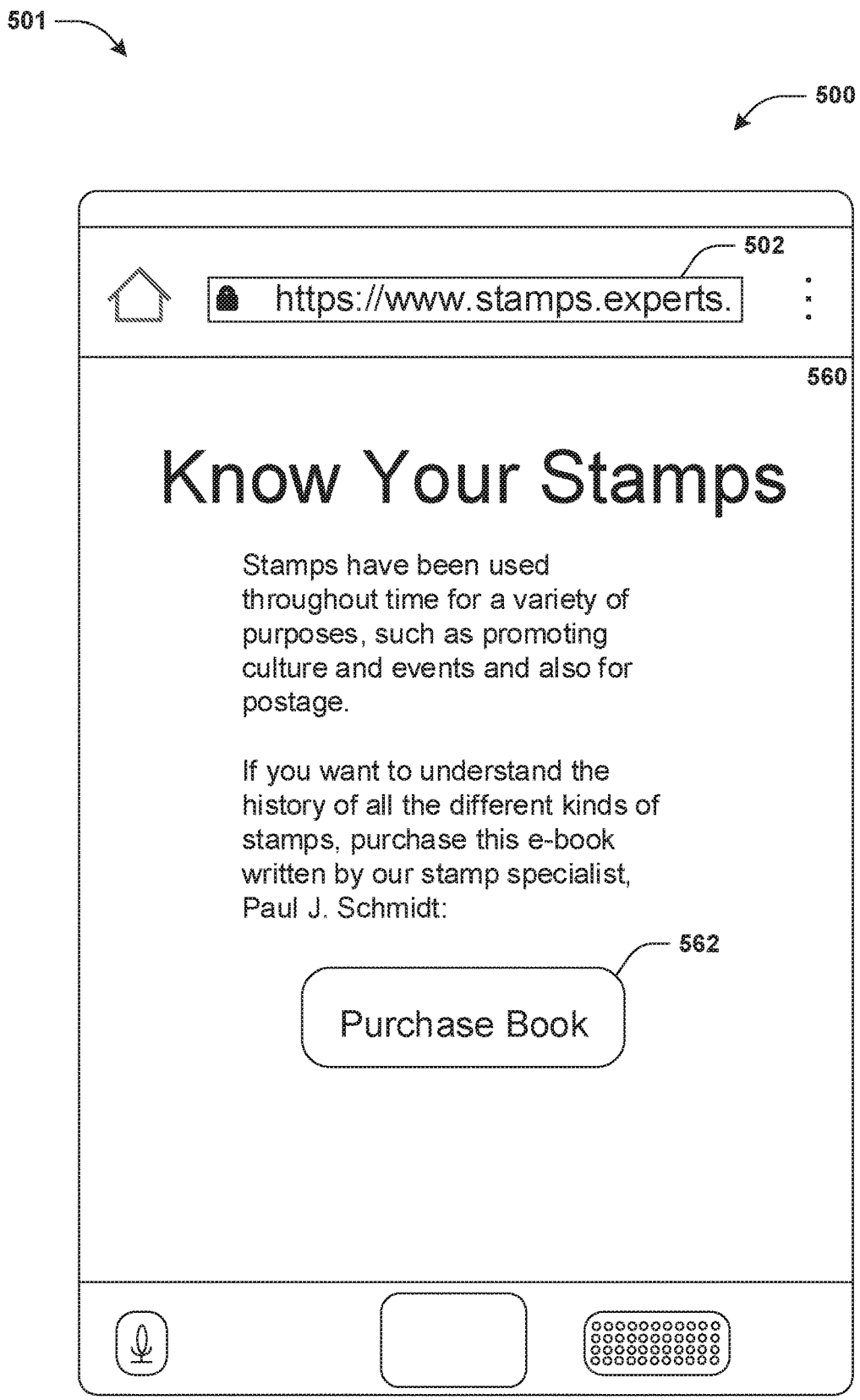
FIG. 5J is a component block diagram illustrating an example system for selecting content items for presentation via devices, where a client device presents and/or accesses a seventh web page using a browser of the client device.

FIG. 5J illustrates the second client device 500 presenting and/or accessing a seventh web page 560 using the browser. The seventh web page 560 may be associated with the entity associated with the first ghost content item "CONTENT 1". In some examples, the seventh web page 560 may comprise a third selectable input 562 associated with purchasing a product (e.g., a book) associated with the entity. In some examples, the first conversion event may correspond to a selection of the third selectable input 562. Alternatively and/or additionally, responsive to a selection of the third selectable input 562, a payment interface may be accessed and/or displayed by the second client device 500. Payment information may be input via the payment interface. In some examples, the first conversion event may correspond to the payment information being input via the payment interface. Alternatively and/or additionally, the first conversion event may correspond to the payment information being processed and/or the purchase being completed.

In some examples, a first conversion event indication, indicative of the first conversion event, may be stored responsive to detecting the first conversion event. For example, the first conversion event indication may be stored responsive to the selection of the third selectable input 562. Alternatively and/or additionally, the first conversion event indication may be stored responsive to the payment interface being accessed and/or displayed by the second client device 500. Alternatively and/or additionally, the first conversion event indication may be stored responsive to the payment information being input via the payment interface. Alternatively and/or additionally, the first conversion event indication may be stored responsive to the payment information being processed and/or the purchase being completed. In some examples, the first conversion event indication may be indicative of the first conversion event and/or a time that the first conversion event is performed.

In some examples, a ghost impression data structure and/or a second user profile associated with the second client device 500 may be analyzed based upon the first conversion event (and/or the first conversion event indication) to determine that the first conversion event is performed after the ghost impression indicator associated with the first ghost content item "CONTENT 1" is generated and/or stored. The first conversion event may be included in a set of conversion events associated with ghost impression indicators associated with the first ghost content item "CONTENT 1". Measurements associated with the first ghost content item "CONTENT 1" may be determined based upon the set of conversion events associated with the ghost impression indicators and/or a different set of conversion events associated with client devices that presented the first ghost content item "CONTENT 1". The measurements may be determined using one or more of the techniques presented herein.

It may be appreciated that the disclosed subject matter may assist the first entity (and/or a device associated with the first entity) in receiving accurate measurements (e.g., included in the measurement report), such as at least one of the first conversion rate associated with the first entity, the first quantity of conversion events associated with the first entity, the first revenue associated with the first entity, the second conversion rate associated with the first entity, the second quantity of conversion events associated with the first entity, the second revenue associated with the first entity, the first relationship, the second relationship, the plurality of sets of conversion information, etc. For example, the measurements may enable the first entity to determine and/or understand the effectiveness of the first content item and/or determine and/or understand the impact that presentation of the first content item has on driving conversion events.

Implementation of at least some of the disclosed subject matter may lead to benefits including, but not limited to, a more efficient determination of measurements (e.g., as a result of selecting the second plurality of content items having the second quantity of content items exceeding the first quantity of content items such that a different auction, that may otherwise be performed due to an insufficient quantity of selected content items after removing one or more ghost content items, may not need to be performed as a result of the second plurality of content items having the second quantity of content items exceeding the first quantity of content items associated with the first request for content, etc.).

Alternatively and/or additionally, implementation of the disclosed subject matter may lead to benefits including a more accurate determination of measurements (e.g., as a result of storing a ghost impression indicator associated with the first content item responsive to determining that a content item with a matching ranking is presented and/or displayed via an internet resource, such that the ghost impression indicator is an accurate indication of an instance that a client device that would have presented the first content item if the first content item was not removed from content items selected in auctions associated with the second group, etc.).

Alternatively and/or additionally, implementation of the disclosed subject matter may lead to benefits including a reduction in losses incurred by decreasing and/or preventing transmission of content items that are not effective and/or do not have an impact on driving users to convert (e.g., as a result of decreasing a rate of transmission of a content item to client devices and/or preventing transmission of the content item to client devices responsive to determining that one or more measurements and/or one or more relationships associated with the content item are less than one or more threshold measurements and/or one or more threshold relationships, etc.).

Alternatively and/or additionally, implementation of the disclosed subject matter may lead to benefits including an increase in generalized revenue for presenting content items via client devices (e.g., as a result of performing the first experiment without the first entity incurring costs and/or expenses associated with presentation of content items via client devices of the second group, as a result of increasing a rate of transmission of a content item to client devices responsive to determining that one or more measurements and/or one or more relationships associated with the content item exceed one or more threshold measurements and/or one or more threshold relationships, etc.).

Alternatively and/or additionally, implementation of at least some of the disclosed subject matter may lead to benefits including a more accurate control of transmission of content items (e.g., as a result of determining one or more measurements and/or one or more relationships associated with a content item, as a result of modifying a rate of transmission of the content item based upon the one or more measurements and/or the one or more relationships, as a result of modifying a transmission control data structure based upon the one or more measurements and/or the one or more relationships, etc.).

Alternatively and/or additionally, implementation of at least some of the disclosed subject matter may lead to benefits including automatic control of transmission of content items without requiring manual effort (e.g., as a result of automatically determining one or more measurements and/or one or more relationships associated with a content item, as a result of automatically modifying a rate of transmission of the content item based upon the one or more measurements and/or the one or more relationships, as a result of automatically modifying a transmission control data structure based upon the one or more measurements and/or the one or more relationships, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
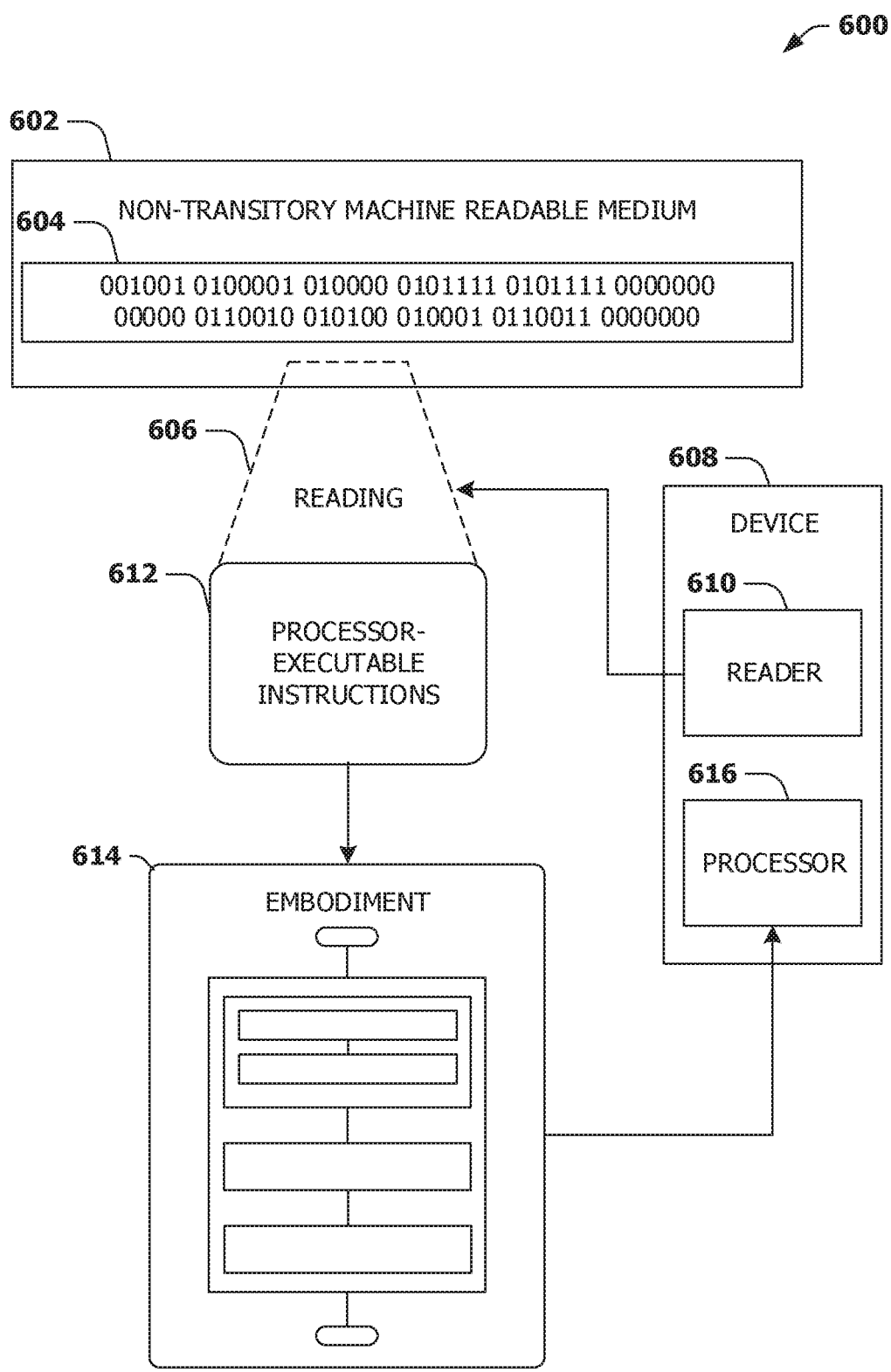
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5J, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for performing an experiment using a plurality of client devices, comprising:
   generating a test group and a control group for the experiment by splitting the plurality of client devices into a first set of client devices associated with the test group and a second set of client devices associated with the control group;
   receiving, by one or more servers, a first request for content associated with a first client device of the first set of client devices, wherein the first request for content is indicative of a first quantity of content items;
   extracting at least one of a format or a structure of content items from the first request for content;
   searching a content item database for content items having at least one of the format or the structure of content items extracted from the first request for content;
   retrieving a first plurality of content items from the content item database based upon a determination that content items of the first plurality of content items match at least one of the format or the structure of content items extracted from the first request for content;
   determining a first plurality of bid values associated with the first plurality of content items;
   selecting, by the one or more servers, a second plurality of content items from the first plurality of content items based upon the first plurality of bid values, wherein:
     the second plurality of content items is associated with a first plurality of rankings; and
     a second quantity of content items of the second plurality of content items is greater than the first quantity of content items associated with the first request for content;
   extracting one or more experiment statuses associated with the second plurality of content items;
   identifying, by the one or more servers, one or more first ghost content items of the second plurality of content items based upon a determination that the one or more first ghost content items are each associated with an experiment status indicative of an ongoing experiment, wherein the one or more first ghost content items are associated with one or more first rankings of the first plurality of rankings;
   selecting, by the one or more servers, a third plurality of content items, of the second plurality of content items, that are not ghost content items for presentation via the first client device of the test group of the experiment, wherein:
     a third quantity of content items of the third plurality of content items is equal to the first quantity of content items associated with the first request for content; and
     the third plurality of content items is associated with a second plurality of rankings;
   providing, by the one or more servers, a first content item, of the third plurality of content items that are not ghost content items, to the first client device of the test group of the experiment, wherein:
     the first content item is associated with a second ranking of the second plurality of rankings;
     a second content item, of the third plurality of content items, is associated with a third ranking of the second plurality of rankings; and
     each content item is displayed in a serve area on the first client device corresponding to a rank of the content item;
   providing, by the one or more servers, a first ghost content item, of the one or more first ghost content items, to the second set of client devices of the control group of the experiment;
   determining whether a first ranking associated with the first ghost content item, matches one or more rankings associated with one or more presented content items;
   responsive to determining that at least a threshold proportion of the first ghost content item was displayed on the first client device, generating and storing, by the one or more servers, a first ghost impression indicator associated with the first ghost content item based upon a determination that the first ranking associated with the first ghost content item matches the second ranking associated with the first content item presented via the first client device;

after storing the first ghost impression indicator, determining, by the one or more servers, one or more measurements associated with the first ghost content item;
tracking, by the one or more servers, at least some of the plurality of client devices that presented one or more content items;
based upon the tracking the plurality of client devices, retrieving at least one of one or more instant messages or one or more emails associated with one or more devices of at least one of the first set of client devices comprising the first client device or the second set of client devices that at least one of received or presented the first ghost content item;
analyzing at least one of the one or more instant messages or the one or more emails to determine (i) first activity associated with the first set of client devices associated with the test group and (ii) second activity associated with the second set of client devices, associated with the control group, that at least one of received or presented the first ghost content item;
determining a first relationship between (i) the first activity associated with the first set of client devices comprising the first client device and (i) the second activity associated with the second set of client devices that at least one of received or presented the first ghost content item;
modifying, based upon the first relationship, a transmission control data structure associated with the first ghost content item; and
controlling, by the one or more servers and based upon the modified transmission control data structure, transmission of one or more content items to one or more client devices, wherein the controlling comprises increasing a rate of transmission to client devices associated with first characteristics and decreasing a rate of transmission to client devices associated with second characteristics based upon the one or more measurements, wherein the controlling creates a closed-loop process that uses results of the experiment as feedback to tailor one or more parameters of a content system.

2. The method of claim 1, comprising:
prior to the storing the first ghost impression indicator, receiving impression information indicative of the first content item being presented via the first client device, wherein:
the storing the first ghost impression indicator is performed responsive to the receiving the impression information indicative of the first content item being presented via the first client device.

3. The method of claim 1, comprising:
analyzing content information associated with the second plurality of content items to identify one or more potential ghost content items, wherein each potential ghost content item of the one or more potential ghost content items is associated with a group of client devices to which the potential ghost content item is not provided; and
analyzing ghost information associated with the one or more potential ghost content items to determine that, for each ghost content item of the one or more first ghost content items, the first client device is included in a group of client devices to which the ghost content item is not provided, wherein the identifying the one or more first ghost content items is performed based upon the determination that, for each ghost content item of the one or more first ghost content items, the first client device is included in a group of client devices to which the ghost content item is not provided.

4. The method of claim 1, comprising:
identifying a fourth plurality of content items of the second plurality of content items that are not the one or more first ghost content items; and
determining a third plurality of rankings associated with the fourth plurality of content items based upon the first plurality of rankings, wherein the selecting the third plurality of content items for presentation via the first client device is performed by selecting the third plurality of content items from the fourth plurality of content items based upon the third plurality of rankings and the first quantity of content items.

5. The method of claim 4, wherein:
the third plurality of rankings comprises the second plurality of rankings; and
the selecting the third plurality of content items from the fourth plurality of content items is performed based upon a determination that rankings of the second plurality of rankings are higher than one or more other rankings of the third plurality of rankings.

6. The method of claim 1, comprising:
determining a first plurality of click probabilities associated with the first plurality of content items based upon at least one of content information associated with the first plurality of content items or a first user profile associated with the first client device, wherein the selecting the second plurality of content items from the first plurality of content items is performed based upon the first plurality of click probabilities.

7. The method of claim 1, comprising:
determining a third plurality of rankings associated with the first plurality of content items based upon the first plurality of bid values, wherein:
the third plurality of rankings comprises the first plurality of rankings; and
the selecting the second plurality of content items from the first plurality of content items is performed based upon a determination that rankings of the first plurality of rankings are higher than one or more other rankings of the third plurality of rankings.

8. The method of claim 7, comprising:
determining a first plurality of click probabilities associated with the first plurality of content items based upon at least one of content information associated with the first plurality of content items or a first user profile associated with the first client device, wherein the determining the third plurality of rankings associated with the first plurality of content items is performed based upon the first plurality of click probabilities.

9. The method of claim 1, comprising:
identifying a first set of ghost impression indicators associated with the first ghost content item, wherein:
the first set of ghost impression indicators comprises the first ghost impression indicator; and
the first set of ghost impression indicators is associated with the first set of client devices comprising the first client device;
determining first conversion information associated with the first set of client devices based upon the first activity associated with the first set of client devices;
identifying a first set of impression indicators associated with the first ghost content item, wherein the first set of impression indicators is associated with the second set of client devices that at least one of received or presented the first ghost content item; and determining second conversion information associated with the second set of client devices based upon the second activity associated with the second set of client devices.

10. The method of claim 9, comprising:
generating, based upon the first conversion information and the second conversion information, a measurement report associated with the first ghost content item.

11. The method of claim 10, wherein:
the determining the first conversion information comprises determining a first conversion rate associated with the first set of client devices;
the first conversion information is indicative of the first conversion rate;
the determining the second conversion information comprises determining a second conversion rate associated with the second set of client devices; and
the second conversion information is indicative of the second conversion rate.

12. The method of claim 11, comprising:
determining, based upon the first conversion information and the second conversion information, a first relationship between the first conversion rate and the second conversion rate, wherein the measurement report is indicative of the first relationship between the first conversion rate and the second conversion rate.

13. The method of claim 10, wherein:
the determining the first conversion information comprises determining a first revenue associated with the first set of client devices;
the first conversion information is indicative of the first revenue;
the determining the second conversion information comprises determining a second revenue associated with the second set of client devices; and
the second conversion information is indicative of the second revenue, the method comprising:
determining, based upon the first conversion information and the second conversion information, a first relationship between the first revenue and the second revenue, wherein the measurement report is indicative of the first relationship between the first revenue and the second revenue.

14. The method of claim 10, comprising:
transmitting the measurement report to a third client device associated with the first ghost content item.

15. The method of claim 9, wherein:
the determining the first conversion information comprises determining a first conversion rate associated with the first set of client devices;
the first conversion information is indicative of the first conversion rate;
the determining the second conversion information comprises determining a second conversion rate associated with the second set of client devices; and
the second conversion information is indicative of the second conversion rate,
the method comprising:
determining, based upon the first conversion information and the second conversion information, a first relationship between the first conversion rate and the second conversion rate; and
modifying, based upon the first relationship, a transmission control data structure associated with the first ghost content item.

16. The method of claim 15, wherein:
the first relationship is indicative of a difference between the first conversion rate and the second conversion rate.

17. The method of claim 9, wherein:
the determining the first conversion information comprises determining a first revenue associated with the first set of client devices;
the first conversion information is indicative of the first revenue;
the determining the second conversion information comprises determining a second revenue associated with the second set of client devices; and
the second conversion information is indicative of the second revenue,
the method comprising:
determining, based upon the first conversion information and the second conversion information, a first relationship between the first revenue and the second revenue; and
modifying, based upon the first relationship, a transmission control data structure associated with the first ghost content item.

18. A computing device comprising:
a processor; and
memory comprising processor-executable instructions that when executed by the processor cause performance of operations, the operations comprising:
generating a test group and a control group for an experiment by splitting a plurality of client devices into a first set of client devices associated with the test group and a second set of client devices associated with the control group;
receiving a first request for content associated with a first client device of the first set of client devices, wherein the first request for content is indicative of a first quantity of content items;
determining a first plurality of bid values associated with a first plurality of content items;
selecting a second plurality of content items from the first plurality of content items based upon the first plurality of bid values, wherein:
the second plurality of content items is associated with a first plurality of rankings; and
a second quantity of content items of the second plurality of content items is greater than the first quantity of content items associated with the first request for content;
identifying one or more first ghost content items of the second plurality of content items, wherein the one or more first ghost content items are associated with one or more first rankings of the first plurality of rankings;
selecting, from the second plurality of content items, a third plurality of content items that are not ghost content items for presentation via the first client device of the test group of the experiment, wherein:
a third quantity of content items of the third plurality of content items is equal to the first quantity of content items associated with the first request for content; and
the third plurality of content items is associated with a second plurality of rankings;
providing a first ghost content item, of the one or more first ghost content items, to the second set of client devices of the control group of the experiment;
determining whether a first ranking associated with the first ghost content item matches one or more rankings associated with one or more content items; and storing a first ghost impression indicator associated with the first ghost content item based upon a determination that the first ranking associated with the first ghost content item matches a second ranking of the second plurality of rankings.

19. A non-transitory machine readable medium having stored thereon processor-executable instructions that when executed cause performance of operations, the operations comprising:

generating a test group and a control group for an experiment by splitting a plurality of client devices into a first set of client devices associated with the test group and a second set of client devices associated with the control group;

receiving a first request for content associated with a first client device of the first set of client devices, wherein the first request for content is indicative of a first quantity of content items;

determining a first plurality of bid values associated with a first plurality of content items;

selecting a second plurality of content items from the first plurality of content items based upon the first plurality of bid values, wherein:

the second plurality of content items is associated with a first plurality of rankings; and a second quantity of content items of the second plurality of content items is greater than the first quantity of content items associated with the first request for content;

identifying one or more first ghost content items of the second plurality of content items, wherein the one or more first ghost content items are associated with one or more first rankings of the first plurality of rankings;

selecting a third plurality of content items, of the second plurality of content items, that are not ghost content items for presentation via the first client device of the test group of the experiment, wherein the third plurality of content items is associated with a second plurality of rankings;

providing a first ghost content item, of the one or more first ghost content items, to the second set of client devices of the control group of the experiment; and storing a first ghost impression indicator associated with the first ghost content item based upon a determination that a first ranking, of the one or more first rankings, associated with the first ghost content item matches a second ranking of the second plurality of rankings.

* * * * *